(12) United States Patent
Maser et al.

(10) Patent No.: US 9,691,428 B2
(45) Date of Patent: Jun. 27, 2017

(54) IDENTIFYING AVAILABLE EXERCISES FOR CUSTOMIZING AN EXERCISE SESSION

(71) Applicant: FitStar, Inc., San Francisco, CA (US)

(72) Inventors: Mike Maser, San Francisco, CA (US); Dave Grijalva, San Francisco, CA (US)

(73) Assignee: Fitbit, Inc., San Francisco, CA (US)

( * ) Notice: Subject to any disclaimer, the term of this patent is extended or adjusted under 35 U.S.C. 154(b) by 164 days.

(21) Appl. No.: 14/203,387

(22) Filed: Mar. 10, 2014

(65) Prior Publication Data

US 2014/0280219 A1     Sep. 18, 2014

Related U.S. Application Data

(60) Provisional application No. 61/800,904, filed on Mar. 15, 2013.

(51) Int. Cl.
| | |
|---|---|
| *G11B 27/031* | (2006.01) |
| *G09B 19/00* | (2006.01) |
| *A63B 24/00* | (2006.01) |
| *G06F 17/30* | (2006.01) |
| *G11B 27/034* | (2006.01) |

(52) U.S. Cl.
CPC ........ *G11B 27/031* (2013.01); *A63B 24/0075* (2013.01); *G06F 17/30386* (2013.01); *G06F 17/30743* (2013.01); *G06F 17/30843* (2013.01); *G09B 19/0038* (2013.01); *G11B 27/034* (2013.01); *A63B 2024/0081* (2013.01)

(58) Field of Classification Search
CPC .............. A63B 24/0075; G09B 19/003; G09B 19/0092

USPC ......................................................... 434/127
See application file for complete search history.

(56) References Cited

U.S. PATENT DOCUMENTS

| | | | |
|---|---|---|---|
| 5,690,582 | A | 11/1997 | Ulrich et al. |
| 5,913,013 | A | 6/1999 | Abecassis |
| 5,949,951 | A | 9/1999 | Sklar et al. |
| 6,027,428 | A | 2/2000 | Thomas et al. |
| 6,453,111 | B1 | 9/2002 | Sklar et al. |
| 6,583,369 | B2 | 6/2003 | Montagnino et al. |
| 6,740,007 | B2 | 5/2004 | Gordon et al. |
| 7,951,044 | B1 | 5/2011 | Burks |
| 8,376,954 | B2 | 2/2013 | Lange et al. |
| 8,529,409 | B1 | 9/2013 | Lesea-Ames |

(Continued)

FOREIGN PATENT DOCUMENTS

EP      1 721 237      8/2012

OTHER PUBLICATIONS

US Office Action, dated Jul. 2, 2015, issued in U.S. Appl. No. 14/203,399.

(Continued)

*Primary Examiner* — Xuan Thai
*Assistant Examiner* — Kristen Shirley
(74) *Attorney, Agent, or Firm* — Weaver Austin Villeneuve & Sampson LLP

(57) ABSTRACT

System, apparatuses, and methods can provide customized exercise sessions and customized videos corresponding to the exercise session. Exercise components that are available to a user for an exercise category can be determined based on a user rank in the category and a rank of the components in the category. Certain available components can be selected to include in a customized session.

21 Claims, 17 Drawing Sheets

(56) References Cited

U.S. PATENT DOCUMENTS

| | | | |
|---|---|---|---|
| 9,613,659 | B2 | 4/2017 | Maser et al. |
| 2005/0002647 | A1 | 1/2005 | Girgensohn et al. |
| 2006/0025282 | A1 | 2/2006 | Redmann |
| 2006/0122035 | A1 | 6/2006 | Felix |
| 2007/0014422 | A1 | 1/2007 | Wesemann et al. |
| 2008/0086318 | A1* | 4/2008 | Gilley .................... G06Q 10/06 705/319 |
| 2008/0096726 | A1* | 4/2008 | Riley ................. A63B 24/0006 482/8 |
| 2008/0103023 | A1 | 5/2008 | Chung et al. |
| 2008/0141135 | A1 | 6/2008 | Mason et al. |
| 2008/0275309 | A1 | 11/2008 | Stivoric et al. |
| 2009/0048044 | A1* | 2/2009 | Oleson ............... A63B 24/0062 473/570 |
| 2009/0048939 | A1 | 2/2009 | Williams |
| 2009/0075782 | A1 | 3/2009 | Joubert et al. |
| 2009/0258700 | A1 | 10/2009 | Bright et al. |
| 2009/0298650 | A1 | 12/2009 | Kutliroff |
| 2010/0331145 | A1 | 12/2010 | Lakovic et al. |
| 2011/0032105 | A1 | 2/2011 | Hoffman et al. |
| 2011/0281249 | A1* | 11/2011 | Gammell ........... A63B 24/0075 434/247 |
| 2011/0319229 | A1 | 12/2011 | Corbalis et al. |
| 2012/0108394 | A1 | 5/2012 | Jones et al. |
| 2012/0122063 | A1* | 5/2012 | Chen .................. A63B 24/0075 434/247 |
| 2012/0274508 | A1 | 11/2012 | Brown et al. |
| 2013/0094830 | A1 | 4/2013 | Stone et al. |
| 2013/0106684 | A1 | 5/2013 | Weast et al. |
| 2013/0316316 | A1 | 11/2013 | Flavell et al. |
| 2014/0013344 | A1 | 1/2014 | Taxier |
| 2014/0082666 | A1 | 3/2014 | Bloch et al. |
| 2014/0099614 | A1 | 4/2014 | Hu et al. |
| 2014/0270711 | A1 | 9/2014 | Maser et al. |
| 2014/0272855 | A1 | 9/2014 | Maser et al. |
| 2014/0280156 | A1 | 9/2014 | Maser et al. |

OTHER PUBLICATIONS

US Final Office Action, dated Apr. 20, 2016, issued in U.S. Appl. No. 14/203,399.
US Office Action, dated Nov. 23, 2015, issued in U.S. Appl. No. 14/203,392.
US Office Action, dated Nov. 27, 2015, issued in U.S. Appl. No. 14/203,406.
"Activator is One of the Best Cydia iPhone Hacks | Control your iPhone with Gestures," iphone-tips-and-advice.com, [retrieved on Jul. 9, 2013 at http://www.iphone-tips-and-advice.com/activator.html], 10 pp.
Chudnow, Alan (Dec. 3, 2012) "Basis Wristband Make Its Debut," *The Wired Self, Living in a Wired World*, published in Health [retrieved on Jul. 22, 2013 at http://thewiredself.com/health/basis-wrist-band-make-its-debut/], 3pp.
DesMarais, Christina (posted on Sep. 3, 2013) "Which New Activity Tracker is Best for You?" *Health and Home, Health & Fitness , Guides & Reviews*, [Retrieved on Sep. 23, 2013 at http://www.techlicious.com/guide/which-new-activity-tracker-is-right-for-you/] 4 pp.
Empson, Rip, (Sep. 22, 2011) "Basis Reveals An Awesome New Affordable Heart and Health Tracker You Can Wear On Your Wrist," [retrieved on Sep. 23, 2013 at http://techcrunch.com/2011/09/22/basis-reveals-an-awesome-new . . . ], 3 pp.
Fitbit User's Manual, Last Updated Oct. 22, 2009, 15 pages.
Forerunner® 10 Owner's Manual (Aug. 2012), Garmin Ltd., 10 pp.
Forerunner® 110 Owner's Manual, (2010) "GPS-Enabled Sport Watch," Garmin Ltd., 16 pp.
Forerunner® 201 personal trainer owner's manual, (Feb. 2006) Garmin Ltd., 48 pp.
Forerunner® 205/305 Owner's Manual, GPS-enabled trainer for runners, (2006-2008), Garmin Ltd., 80 pp.
Forerunner® 210 Owner's Manual, (2010) "GPS-Enabled Sport Watch," Garmin Ltd., 28 pp.
Forerunner® 301 personal trainer owner's manual, (Feb. 2006) Garmin Ltd., 66 pp.
Forerunner® 310XT Owner's Manual, Multisport GPS Training Device, (2009-2013), Garmin Ltd., 56 pp.
Forerunner® 405 Owner's Manual, (Mar. 2011) "GPS-Enabled Sport Watch With Wireless Sync," Garmin Ltd., 56 pp.
Forerunner® 405CX Owner's Manual, "GPS-Enabled Sports Watch With Wireless Sync," (Mar. 2009), Garmin Ltd., 56 pp.
Forerunner® 410 Owner's Manual, (Jul. 2012) "GPS-Enabled Sport Watch With Wireless Sync," Garmin Ltd., 52 pp.
Forerunner® 50 with ANT+Sport™ wireless technology, Owner's Manual, (Nov. 2007) Garmin Ltd., 44 pp.
Forerunner® 910XT Owner's Manual, (Jan. 2013) Garmin Ltd., 56 pp.
Garmin Swim™ Owner's Manual (Jun. 2012), 12 pp.
Lark/Larkpro, User Manual, (2012) "What's in the box," *Lark Technologies*, 7 pp.
Larklife, User Manual, (2012) *Lark Technologies*, 7 pp.
Nike+ FuelBand GPS Manual, User's Guide (Product Release Date Unknown, downloaded Jul. 22, 2013), 26 pages.
Nike+SportBand User's Guide, (Product Release Date Unknown, downloaded Jul. 22, 2013), 36 pages.
Nike+SportWatch GPS Manual, User's Guide, Powered by Tomtom, (Product Release Date Unknown, downloaded Jul. 22, 2013), 42 pages.
"Parts of Your Band," (Product Release Date Unknown, downloaded Jul. 22, 2013) Jawbone UP Band, 1 page.
Polar WearLink® + Coded Transmitter 31 Coded Transmitter W.I.N.D. User Manual, Polar® Listen to Your Body, *Manufactured by Polar Electro Oy*, (2010) 11 pages.
Rainmaker, (Jun. 25, 2012, updated Feb. 16, 2013) "Garmin Swim watch In-Depth Review," retrieved on Sep. 9, 2013 at http://www.dcrainmaker.com/2012/06/garmin-swim-in-depth-review.html, 38 pp.
US Final Office Action, dated Jun. 17, 2016, issued in U.S. Appl. No. 14/203,392.
US Final Office Action, dated Jun. 13, 2016, issued in U.S. Appl. No. 14/203,406.
"Video Editing: Cutting on Motion," (Jan. 27, 2012) Steve's Digicams, [Retrieved Jun. 7, 2016, from https://web.archive.org/web/20120127002001/http://www.steves-digicams.com/knowledge-center/how-tos/photography-tips/video-editing-cutting-on-motion.html], 2pp.
US Office Action, dated Nov. 16, 2016, issued in U.S. Appl. No. 14/203,399.
US Office Action, dated Nov. 17, 2016, issued in U.S. Appl. No. 14/203,392.
US Notice of Allowance, dated Nov. 23, 2016, issued in U.S. Appl. No. 14/203,406.

* cited by examiner

500

510 — Receive user's current rank, component's rank, and feedback about user's performance of component 520 — Determine a predicted score based on user's rank and the component's rank 530 — Determine user score based on user feedback 540 — Compare the predicted score to the user score to determine outcome score 550 — Determine amount of increase or decrease in user rank based on outcome score

605  Starting map[chest:195 core:195 legs:195 back:195 arms/shoulders:195 cardio:195]

610
cardio    user:195 component:190 r: 0/0    s: 90/90 d:10 103  97 p:0.517 e:0.814 a:1.562 s:0.644 = 62.16834
cardio    user:195 component:190 r: 0/0    s: 90/90 d:10 103  97 p:0.517 e:0.814 a:1.562 s:0.644 = 62.16834
chest     user:195 component:190 r: 12/12  s: 0/24  d:10 103  97 p:0.517 e:0.814 a:1.562 s:0.644 = 62.16834
core      user:195 component:190 r: 0/0    s: 60/60 d:10 103  97 p:0.517 e:0.814 a:1.562 s:0.644 = 62.16834
core      user:195 component:190 r: 0/0    s: 60/60 d:10 103  97 p:0.517 e:0.814 a:1.562 s:0.644 = 62.16834
cardio    user:195 component:190 r: 0/0    s: 90/90 d:10 103  97 p:0.517 e:0.814 a:1.562 s:0.644 = 62.16834
chest     user:195 component:190 r: 12/12  s: 0/24  d:10 103  97 p:0.517 e:0.814 a:1.562 s:0.644 = 62.16834
core      user:195 component:190 r: 0/0    s: 60/60 d:10 103  97 p:0.517 e:0.814 a:1.562 s:0.644 = 62.16834
chest     user:195 component:190 r: 12/12  s: 0/24  d:10 103  97 p:0.517 e:0.814 a:1.562 s:0.644 = 62.16834
core      user:195 component:190 r: 0/0    s: 60/60 d:10 103  97 p:0.517 e:0.814 a:1.562 s:0.644 = 62.16834

Change map[cardio:62 chest:62 core:62]

After map[chest:257 core:257 legs:195 back:195 arms/shoulders:195 cardio:257]

FIG. 6

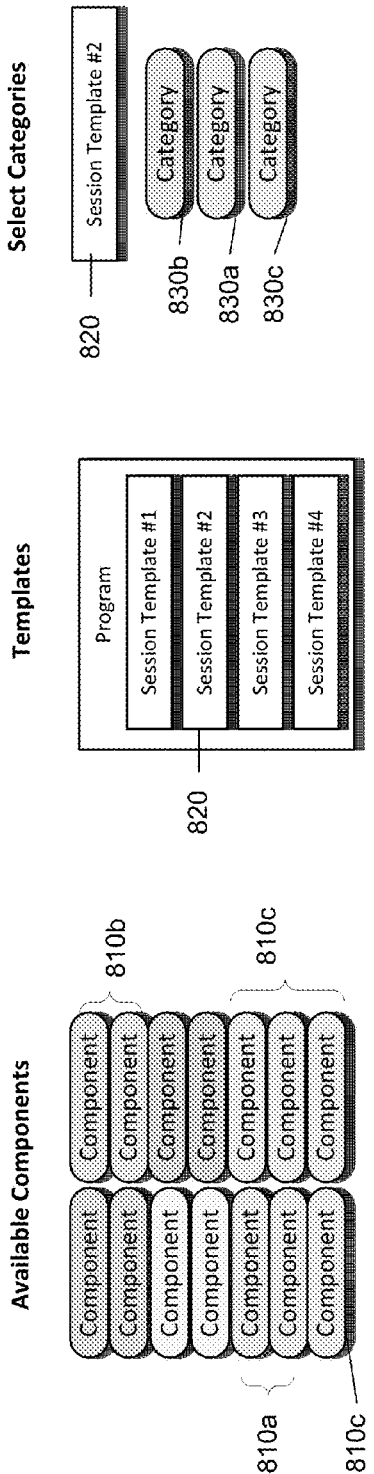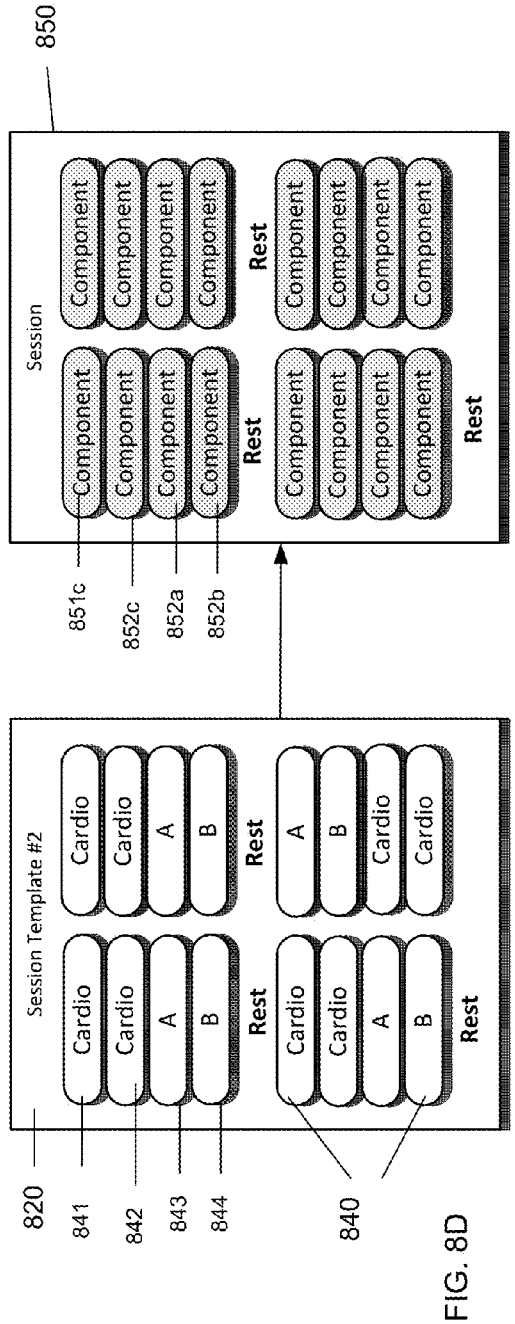

| Plank to Downward Dog | 40 |
| Split Stance Back Extension | 25 |
| Air Jump Rope | 3:30 |
| Perfect Pushups | 50 |
| Squats | 25 |
| Plank to Downward Dog | 40 |
| Split Stance Back Extension | 25 |
| Air Jump Rope | 3:30 |

FIG. 10

IDENTIFYING AVAILABLE EXERCISES FOR CUSTOMIZING AN EXERCISE SESSION

CROSS-REFERENCES TO RELATED APPLICATIONS

The present application claims priority from and is a nonprovisional application of U.S. Provisional Application No. 61/800,904, entitled "Systems And Methods For Encouraging Physical Activity" filed Mar. 15, 2013, the entire contents of which are herein incorporated by reference for all purposes.

This application is related to commonly owned and concurrently filed U.S. patent application Ser. No. 14/203,392, entitled "Selecting Available Exercises For Customizing An Exercise Session,"; U.S. patent application Ser. No. 14/203,399, entitled "Generating A Custom Exercise Video," and U.S. patent application Ser. No. 14/203,406, entitled "Generating Custom Audio Content For An Exercise Session," the disclosures of which are incorporated by reference in their entireties.

BACKGROUND

Physical activity is important to the general health of human beings. Unfortunately, this health benefit is oftentimes not enough to get people to commit to a routine of physical activity. People often neglect to participate in physical activity because of psychological, physical, financial, and other barriers. For instance, people may not participate in a healthy amount of physical activity because they don't have the money to go to a gym or to hire a personal trainer, don't have time to commit to an inflexible fitness regimen, are too embarrassed to work out in a public setting, don't find that pre-rendered (i.e. DVD-based) fitness curriculum comprehend their level of fitness or health goals, or just generally lack motivation. Current products offer a patchwork of solutions to help people overcome these hurdles. However, each have shortcomings.

One way for people to engage in physical activity is to join a gym, but this can be costly, particularly if live classes or personal trainer sessions are added. A personal trainer is expensive, and there is often times no ongoing communication between the trainer and trainee between sessions to develop an engaging regimen of physical activity for the trainee. Additionally, people may feel embarrassed to work out in a public setting. Further, the gym solution can be inconvenient for people, with problems arising that are related to scheduling, overcrowding, accessibility, and parking.

Over the years, in-home exercise solutions have popped up to combat disadvantages related to gyms. One of these solutions is the traditional exercise video, which the user plays on a media player in his home. The traditional exercise video features a pre-recording of one or more people instructing physical activity. The intent of this solution is for the user to follow along with the physical activity demonstrated by the people shown in the video. But, these exercise videos are static and don't change to a user's needs. Even if one had multiple videos, the videos are still static.

Embodiments of the present invention can address these and other problems.

BRIEF SUMMARY

System, apparatuses, and methods can provide customized exercise sessions and customized videos corresponding to the exercise session. In one embodiment, exercise components that are available to a user for an exercise category can be determined based on a user rank in the category and a rank of the components in the category. The components within a range of the user's rank or other target rank can be identified as available. The user's rank can be updated based on how the user performs during an exercise, e.g., based on user feedback, such as self-reporting or sensor data. Certain available components can be selected to include in a customized session.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 5 is a flowchart of a method 500 for updating a user rank in a particular category according to embodiments of the present invention.

FIG. 6 shows a table 600 illustrating an update of user ranks in various categories according to embodiments of the present invention.

FIGS. 8A-8D illustrate the creation of an exercise session according to embodiments of the present invention.

FIG. 10 shows an example session that can be provided to a user according to embodiments of the present invention.

DEFINITIONS

Figure 1:
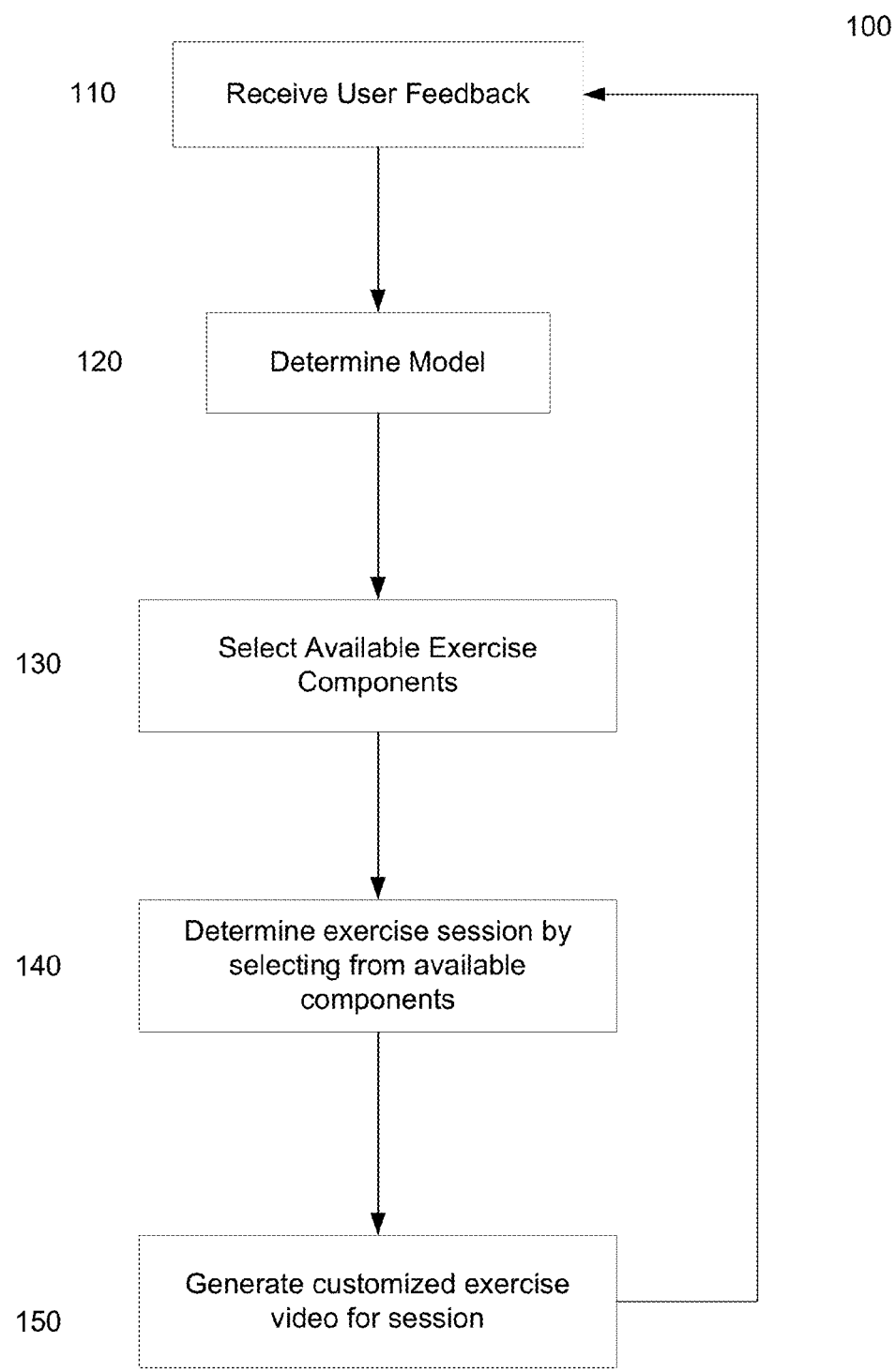
FIG. 1 is a flowchart illustrating a method 100 for customizing an exercise session and generating a customized video and/or audio for the session according to embodiments of the present invention.

A "move" corresponds an individual exercise (e.g. push-ups, running, squats, yoga positions, physical therapy exercises, etc.). A move can be repeated, e.g., a push-up. Or, a move can be performed for a particular duration, e.g., time or distance, as may occur with running. A "component" corresponds to a move and an amount of activity. For example, the amount of activity can specific a number of reps (repetitive cycles, such as a number of push-up). The number of reps for a component can be organized into a number of sets (e.g. 2 sets of 25 pushups) and other hierarchies. Different components can be of the same move, but have a quantitative value (e.g., different number of sets and/or reps, a different time duration, different distances, different elevations, moves per unit time, etc.).

A "category" corresponds to a particular type of exercise, e.g., that targets a particular muscle group, skill, etc. Examples of categories include arms, legs, shoulders, back, chest, cardio, and core. Other examples (e.g., for yoga) can include balance, strength, and flexibility. For running, examples can include endurance, pace, and heart rate. Different sets of categories can correspond to different curriculums. Thus, a "curriculum" can correspond to a particular set of categories, and the components of those categories. A component is assigned to one or more categories. A set of components can be associated with a category. A user can be associated with certain categories. For example, a user can select a running curriculum, and then the user would be associated with the set of categories for the running curriculum.

Each component can be given a "rank" in a category associated with the component. The rank can identify a level of difficulty for the component. The difficulty may be the result of the amount of activity for the component, e.g., with increasing rank for increasing activity. A user can be given a rank for each of a plurality of categories, e.g., those categories associated with a selected curriculum. As examples, a rank can be a numerical value (e.g., integers, fractions, real numbers using decimals) or classifications, with sublevels in any hierarchal fashion.

A "session" is composed of components to be performed during a time period, e.g., in an hour. A session can include rest periods, instructions, and other segments. A session can be a complete workout. A session can include one or more of: a video showing the components; audio giving instructions, tips, encouragement, or other audio; and music selections for the session. A "schedule" can correspond what categories are to be performed on what days as part of a session. A schedule may or may not include the specific components to be performed on particular days. For example, a schedule could specify to work out legs and back on one day, and chest and arms two days later.

A "program" correlates to an objective. Examples of programs can include Get Strong, Get Moving, Get Lean, etc. A program can have one or more session templates (also called a template). A template can specify an organization for a session, e.g., a number of categories that must be selected, categories that are required, and time slots associated to optional or required categories. Templates can contain other things, such as rest periods, warmups, cooldowns, other video inserts, etc. A session template can be used for the construction of a session. A program can contain session templates, scheduling rules, and other bits for tailoring the experience to the user.

The term "user feedback" may refer to any information obtained actively or passively from or about a user. A user may provide answers to questions, e.g., when creating a profile, before a session, or after a session. As another example, sensors can obtain information from a user before, during, or after a session. For example, a heart rate sensor can monitor exertion during a component of a session. Example sensors include FITBIT™ and JAWBONE™.

DETAILED DESCRIPTION

Embodiments may comprise systems, apparatuses, and methods for forming a portable fitness program around a user-system feedback loop so as to provide customized sessions, as well as customized videos. Some embodiments may provide customized videos by generating and/or manipulating video and/or audio recording of fitness content, automatic editing to form video programs featuring varying levels of fitness difficulty, and presenting the video to a user. A video and/or audio can be modified in response to user feedback received from any number of devices and sensors. Implementations herein may be embedded into desktop computers, mobile devices (e.g., tablets, phones, and notebook computers), smart televisions, gaming consoles, streaming platforms, and other devices.

Embodiments can create infinitely customizable content easily and quickly, from just a small amount of recorded video and audio data. In one embodiment, a trainer is simultaneously recorded performing exercises from different angles by multiple video recording devices. This method of recording video can allow the data to be manipulated to produce customized content targeted to specific viewers based on a multitude of factors. For example, the video and audio data recorded may be edited to produce a plurality of visually and aurally seamless looping iterations that may be broken down and categorized depending on their subject matter and degree of difficulty. This assembly of movement-related content can respond to user feedback, which can gives users relatively low-cost access to the content that they need to stay engaged and motivated to achieve their fitness health goals, when they need it.

Embodiments can receive, normalize, and analyze data from multiple devices to customize the content that is presented to the user. This process of data collection and responsive customization of content can create a "feedback loop," which allows certain embodiments to deliver a fitness experience (e.g., customized sessions and videos) that adapts to the user, rather than leaving the user bored or overworked with linear media experiences.

Further, embodiments can automatically push (or ease up on) the user as his fitness level changes, rather than becoming stale or obsolete. For example, how a user has performed during a session can be tracked. Whether certain exercises were too difficult or too easy can be determined by analyzing user feedback. And, exercises in a subsequent session can be selected based on the user feedback.

I. Overview

Embodiments can perform various functions. For example, embodiments can analyze user feedback to determine exercise components that are suitable for a user. For example, a user's rank within a category can be updated based on recent performance so that suitable components (e.g., similarly ranked components) can be identified for future sessions. Embodiments can select components for a customized session. Embodiments can then generate a customized video that shows the specific selected components being performed, e.g., by combining different video tracks from different camera angles. These embodiments are described in more detail in later sections. Embodiments can also provide customized audio for sessions, such as customized vocal coaching (e.g., encouragement at a particular time as determined from user feedback, such as sensors).

A. General Method

FIG. 1 is a flowchart illustrating a method 100 for customizing an exercise session and generating a customized video and/or audio for the session according to embodiments of the present invention. Method 100 can be performed entirely or partially by one or more computing devices, as can other methods described herein. For example, methods can be performed by a client device (e.g., a mobile device) and/or a server, which may be in communication with the mobile device.

At block 110, user feedback is received. The user feedback can take many forms. For example, after a user signs up, user can answer questions about his/her physical condition. Example questions can involve age, weight, and height. User feedback can be about a fit test that the user performs upon initializing profile. The fit test can correspond to an initial exercise session about which questions can be asked to the user, and answers can be received from the user as part of self-reporting data. Other example user feedback can include information obtained from sensors, e.g., heartbeat. Any user feedback can be obtained during or after an exercise session.

At block 120, a model is determined. The model can correspond to a fitness level of the user. The fitness level can be used to determine appropriate exercise sessions for the user. A fitness level can be determined for each of a plurality of different categories of exercises. Different exercises (also called moves) can also be modeled; the model can account for the number of repetitions and/or duration of an exercise, or other quantitative amount of an exercise, e.g., to provide a rank for a component that includes the move. In one embodiment, the fitness level for particular category corresponds to a rank in the category, where the rank can be compared to ranks of exercise components. For example, a particular curriculum can have six categories, and a user can be assigned a rank of how advanced the user is in each of the six categories. Examples of curriculums include a physical therapy curriculum, a weight training curriculum, and a running curriculum. Curriculums can have various programs within them, e.g., directed to different types of weight training.

At block 130, exercise components that are available to the user are selected. These exercise components can be selected based on the user's model in the models for the different exercise components. For example, each category for a curriculum can have components that are associated with that category. In a weight training curriculum, certain components can be associated with the chest (e.g., push-ups, bench press, etc.). Embodiments can then select appropriate (available) components for a category from the list of all components from category based on the respective models. For instance, components that have a similar rank as a user rank in the category can be selected.

At block 140, an exercise session can be determined by selecting only available exercise components. The exercise session can provide a name and/or description of the exercise components to be performed for a given time period, e.g., a day, an hour, or several hours. A session might include only some of the categories of an exercise program that the user has selected. The categories to be used for particular session can be selected based on various criteria, such as the categories used for previous sessions.

An exercise session can be generated automatically one response to request from a user. For example, an exercise session can be generated at a specific time every day, every other day, or any other suitable schedule. A user might also want to generate a session, e.g., when the user wants to add a session to schedule. The exercise session can be determined using various optimization techniques.

At block 150, a customized video is generated for the customized session. The customized video can be generated from video clips of a person (e.g., a trainer) performing each exercise component selected for the session. The video clips can be for a fixed amount of an exercise move, but the video clips can be edited to provide the prescribed amount of the exercise component. The video for a particular component (e.g., 25 push-ups) can be generated from multiple video tracks, each taken of the trainer with a different camera at the same time. Block 150 can assemble the pre-recorded tracks and playback the video to the user.

As the amount (e.g., number of reps, elevation change, or duration) corresponding to an exercise component can vary, the video tracks are spliced together to provide the designated amount of the exercise component. For example, the software might determines that the user should do 13 pushups. However, the servers of the system might not store any video track of exactly 13 push-ups. A video clip of 13 push-ups can generated from multiple video tracks that are combined at particular time points to provide a seamless clip of 13 push-ups. The custom video can also have custom audio, e.g., audio cues at specific times that had been identified as needing extra coaching, tips, the countdown, etc. In some embodiments, only custom audio is created. Any discussion herein mentioning custom video can also be applied to generating custom audio.

Embodiments can repeat method 100. For example, user feedback can be determined about the customized session, and the user model can be updated. The models for the components can also be updated periodically. In this manner, the customized video and sessions can continue to evolve with the user.

B. System

Figure 2:
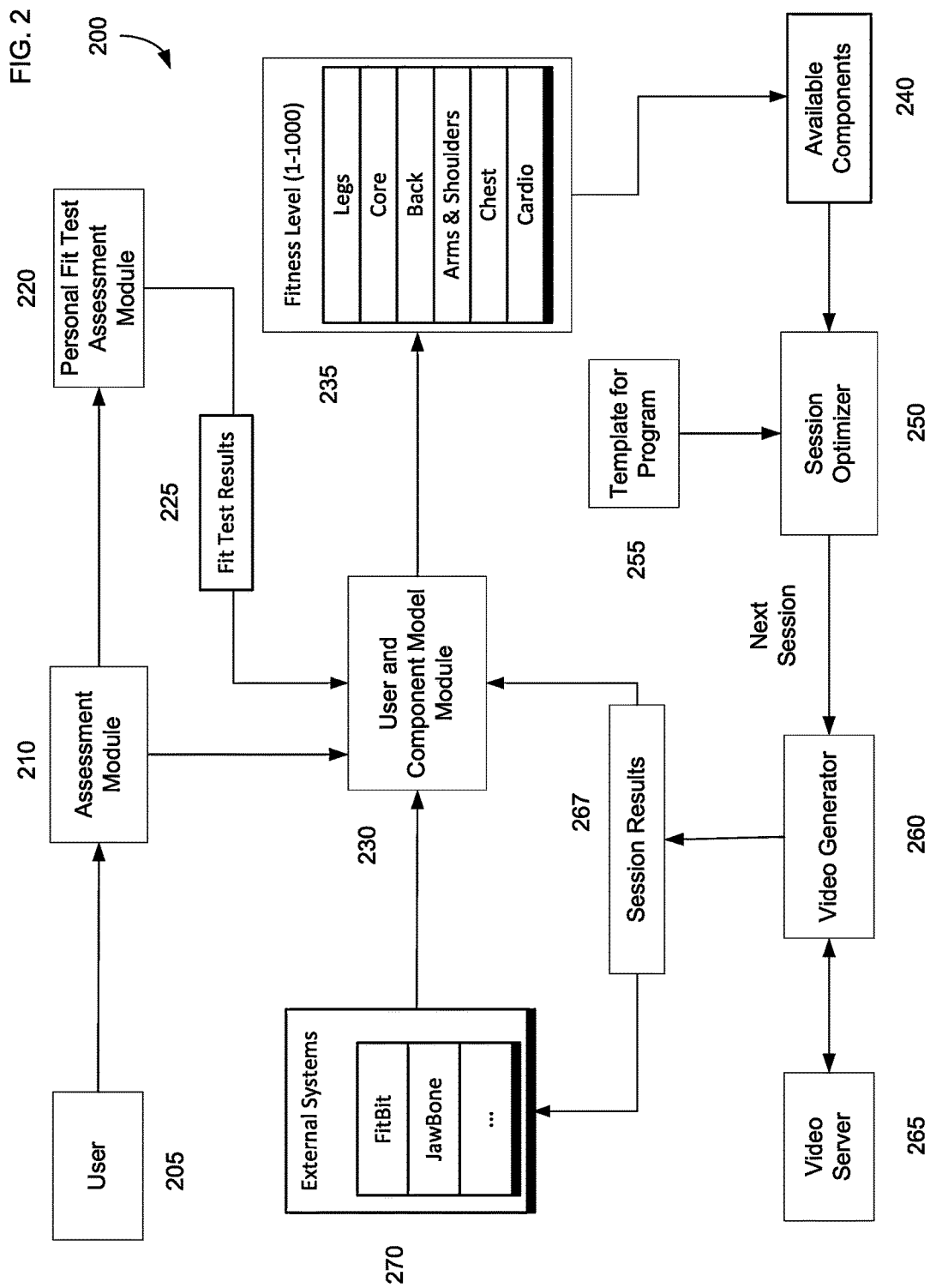
FIG. 2 shows a block diagram of a system 200 for generating customized exercise sessions and videos according to embodiments of the present invention.

FIG. 2 shows a block diagram of a system 200 for generating customized exercise sessions and videos according to embodiments of the present invention. System 200 can help to trigger physical activity through the use of generated video and data-driven feedback loops. Certain embodiments can use pre-recorded fitness content that are edited in real time to form programs of varying difficulty levels, which can then be presented to a user. The various modules of system 200 can reside on a client device, a server, or a combination of both.

In one implementation, the presented content can be modified in response to user data received from any number of devices, thereby forming a user-system feedback loop. This feedback loop and other design flexibility increases the chances of the user continuing to engage in physical activity, as embodiments can continually produce and deliver customized content so that the user is never burned out from being pushed too hard, and is never bored from not being pushed enough. This feedback loop and other design flexibility can also applies to physical therapy to help with various physical rehabilitations. The user can understand their progress and the feedback loop may send data back to the therapists so that they too can monitor progress and make changes to the program.

In FIG. 2, a user 205 can register with the software and select a fitness program, e.g., one that is aligned to goals of user 205, such goals can include to get lean or to get strong. User 205 can interact with an assessment module 210 to provide user data as part of user feedback. Examples of the type of user data includes: current fitness level, gender, age, height, weight, body mass index (BMI), and fitness goals. Assessment module 210 can interact with user 205 via any suitable user interface, such as a keyboard, a touchscreen, or voice recognition. Assessment module 210 can provide questions to a user and receive responses. Assessment module 210 can evolve over time (e.g., questions of a questionnaire can change) and can be customized to a user. Assessment module 210 can also interact with sensor devices that obtain measurements from a user.

The user data can be used by assessment module 220 to determine a personal fit test for user 205. The fit test can be selected to correspond to an initial estimate for a fitness level of user 205. User 205 can perform the fit test, and user feedback can be obtained. Such user feedback can include a self-assessment from 205 (e.g., too easy or too hard) and sensor measurements, such as heart rate or GPS data. A purpose of the fit test can be to obtain the test results 225, which can be used to create a more accurate model of the user's fitness level.

The information from assessment module 210 and fit test results 225 can be fed into module 230 for determining the user model and a component model. External systems 270 are shown also providing data to module 230. Such data can result from the fit test or from later exercise sessions. Module 230 can output the user's fitness level 235 in various categories, as is shown.

A module 240 can use the user's fitness level to determine components that are available for determining an exercise session for user 205. Module 240 can also use data corresponding to difficulty rankings of components for each of the categories. Session optimizer 250 can use the available components and a template 245 for the program that the user has chosen. In one embodiment, session optimizer 250 can determine exercise components to fill in time slots based on various criteria. The determined session can be defined by a plurality of components in a particular order, where certain rest periods can be part of the template.

The next session can be fed into a video generator 260 that creates a customized video corresponding to the customized accession. Video generator 260 can be part of or communicate with a video server 265 that stores various video tracks to be used in generating the customized video. Further details about various aspects of system 200 provided in more detail later.

After a next session is provided to the user, additional user feedback can be obtained about that specific session. This session results 267 can be provided to external systems 270 and module 230. Module 230 can then update the user's fitness level and a new session and customers video can be generated. Session results 267 can also be used to update the present video, e.g., by changing a component or adding audio (e.g., some encouragement). This feedback can provide an interactive experience, as opposed to a simple presentation of a one-way viewing experience delivered to the user.

In one embodiment, video generator 260 can generate a bundle of media assets that are served as a file to a client device (e.g., a mobile device), and the client software can assemble the video from video tracks (resource files) stored on video server 265. The file sent to the client device can include a set of instructions on how to take the resource file(s) and turn it into a sequence (final video) that can be played back for the user. The generation of the final video for playback can be done ahead of time and stored or it can be done in real time to provide a video stream. In the former example, the video can be streamed from a server or played from a local file on the user device. In the latter example, embodiments can produce a video file that is played without actually ever producing the intermediary file.

In one embodiment, the video can be provided to a user's device in a stream over a network (e.g., the Internet). Mobile WAN and wireless LAN networks can be used in delivering the final video or an instruction file for directing how a client is to put together the video tracks to obtain the final video.

II. User Feedback

As described above, embodiments can obtain user feedback in a variety of ways. This section describes some example ways for gathering user feedback.

Certain embodiments may allow the user to sign up for a service, which may run on a server, for delivering customized sessions and videos. Some embodiments include a client application that can run on a laptop, TV, mobile phone, tablet, or other device using a graphical user interface (GUI). Users may then access a server application, and submit certain user data. This user data may be inputted manually by the user, or it may be automatically collected with the assistance of any number of devices.

A. Assessment

In an initial registering process, embodiments may prompt the user to answer questions or perform certain physical tasks. An initial question can be about which program the user would like to select. Different programs can last for a different amount of time (e.g., a 7-week program or 12-week program), have different numbers of sessions per week, and the sessions can be of different lengths. The different programs can also have different goals, e.g., to maintain a current fitness level, increase a fitness level, muscle building, increase cardio, increase flexibility, or other suitable goals. These examples can be composed of multiple programs, e.g., muscle building can include middle-of-the-road body building or strength building program.

Other questions can include various body metrics, which can be self-reported. Such data can include the user's age, gender, height, weight, or other data. An example question is: "How long do your typical workouts last?", which can be used to determine an amount of time that the user wishes to allocate to exercise. The answers can be freeform (e.g., any amount of time in the last example) or be selected from a list (e.g., 15 minutes, 15-30 minutes, 30-45 minutes, or more than 45 minutes). The amount of time to be allotted can be formed in multiple questions, e.g., how many sessions per week and how many weeks.

Another question is: "how would you describe your current fitness level", which can have various categories with an increasing fitness level, such as just getting started, pretty fit, athletic, and Olympic. Some questions can have multiple answers, e.g., "what's important to you" can allow a user to select any one or more of: weight loss, improving strength, staying fit, and self-improvement.

Embodiments may then use all of the data received from the user to designate an initial fitness level for the user. For example, embodiments may place someone who indicates that they are in great physical fitness into an advanced level, and thus will be presented with a program or initial fit test categorized as high difficulty. The analysis used to develop an initial placement designation embodied in a fitness baseline may use curve fitting, load balancing, and other advanced methods. If used for physical therapy, the initial placement may focus on the particular area that needs to be rehabilitated.

B. Fit Test

In an initial registering process, embodiments may prompt the user to perform an initial exercise session. The initial exercise session can specify exercise components to be performed. The user may then view a video corresponding to the initial session and engage in the featured content-specific activity. For instance, the user may attempt to do jumping jacks at the same pace as the person of the video. The fit test can act as a diagnostic session by providing a short workout to get a base level for the user's fitness level. Sensor data can monitor the performance, and the user can provide explicit feedback via a user interface.

In one embodiment, the fit test can be for running. For example, the user can go on a run (e.g., of predetermined length, time, elevation, etc). Embodiments can provide a graphical data display (e.g., a map) to guide the user through the fit test. A customized video can include a such a graphical data display. Customized audio can be provide alone or with video as part of a fit test, as well as with any session.

During this process, quantitative and qualitative data may be manually input by the user and/or automatically captured from Internet connected devices. For example, embodiments may receive data from the user's electronic fitness wristband (among other devices) while the user is doing jumping jacks. Additionally, during a break in between sets of jumping jacks, the user may be prompted to report how many jumping jacks the user completed (quantitative data), and to describe the user's subjective experience during the jumping jacks session, e.g. did the user find it easy or hard to complete the exercise (qualitative data).

Figure 3:
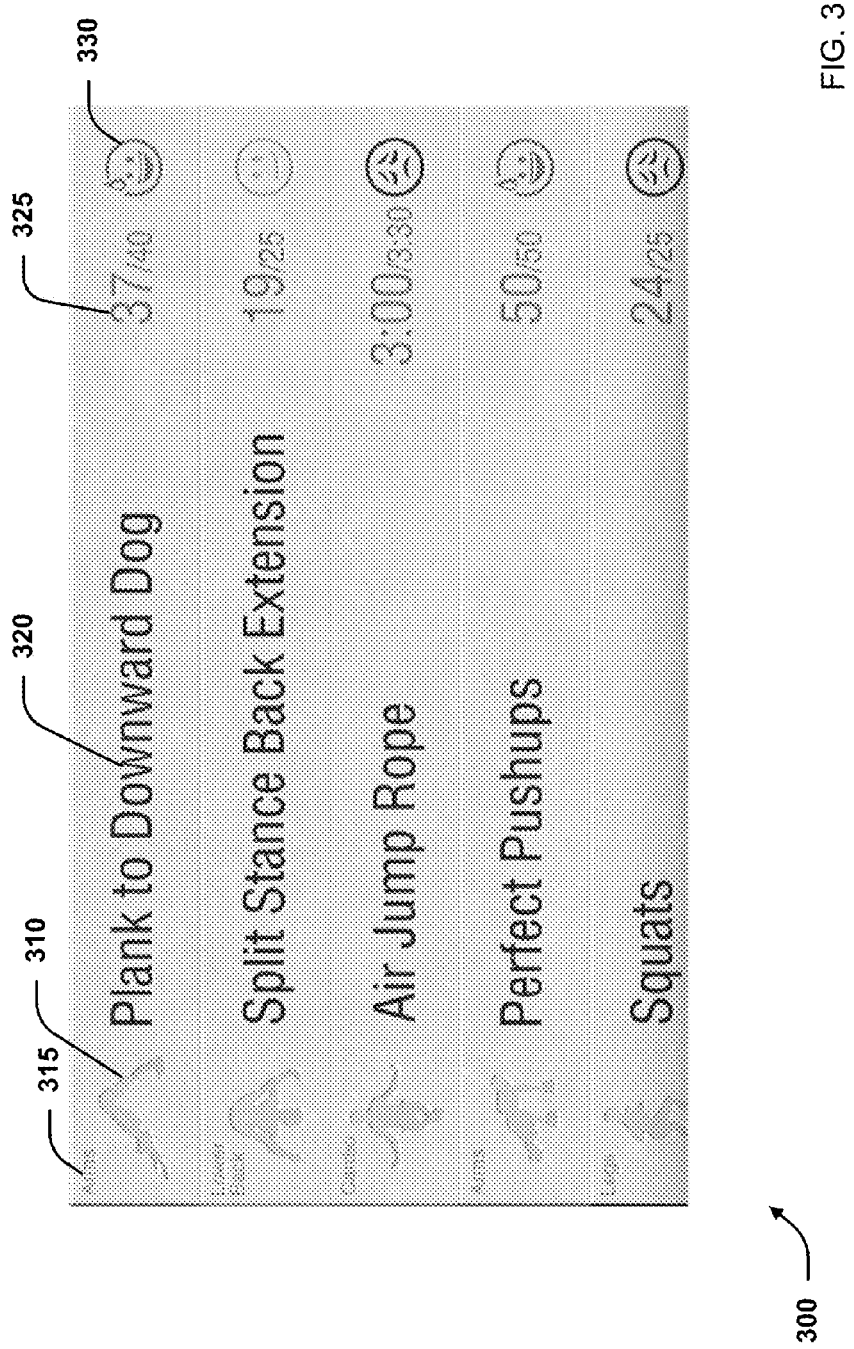
FIG. 3 shows an example fit test 300 along with results according to embodiments of the present invention.

FIG. 3 shows an example fit test 300 along with results according to embodiments of the present invention. FIG. 3 only shows a portion of the components of the fit test. More components or less components can be performed. Each component can have an outline 310 of a person performing the exercise component and a name 315 of the category associated with the component. In the example shown, a name or short description 320 is provided, along with a number of reps or duration 325. The number of reps or duration 325 is shown as a fraction with the actual amount accomplished in the numerator, and the denominator is the total amount that was to be performed. Another example is a number of reps in a time duration. A symbol 330 indicates how well the user did.

During or after the fit test, questions can be asked. The user feedback about the fit test can be in response to quantitative and qualitative questions. A quantitative question can be the amount actually performed. A quantitative question can pertain to how difficult the component was.

C. User Devices

Data may be captured from any number of sensing devices before, during, or after the user's engagement in content-specific activity. The content specific activity can include the fit test or sessions once an exercise program has begun. For example, the user may have a device that measures the amount and quality of sleep that he receives each night. Or, the user may wear a device on the user's wrist, arm, leg or chest that measures the user's heart rate. Or, the user may have a device that sits on the top of the user's television screen that tracks the user's physical movement. The sensors can measure any internal property of a user (e.g., breathing, heart rate, sleep state, etc.) and an external property (e.g., amount of motion).

Embodiments can use application programming interfaces (APIs, which are protocols intended to be used by software components to communicate with each other) to normalize the data it receives from certain sources. This normalization process can translate the received data into a form that is consistent across sources and therefore be reliably employed. For example, certain electronic wristband fitness devices may measure the same amount of physical activity differently: a wristband from manufacturer A correctly reports the runner of a marathon as having run 26.2 miles, while a wristband from manufacturer B worn by the same runner on the same marathon race incorrectly reports a run of 25.9 miles. The normalization can be based on data received from multiple users and/or be based on specifications published by a manufacturer. The APIs that can correct for this discrepancy between the received data from wristband, giving a more accurate set of data to work with. The accuracy is important because certain embodiments may use such data to further customize the program content that is delivered to the user, as described herein.

The transmission of data from the external sensor systems can be wireless (e.g., BLUETOOTH™) or wired, and can be to any user device (e.g., a phone). The gathering of data can be automatic, e.g., when the two devices are in proximity. The gathering of data can also be between client applications on a same device, between a client application and a server application, or be between two server applications. Communication between applications can be triggered as a batch process (e.g., at a particular time) or in response to a manual request by the user. Once downloaded, any pre-programmed analysis (e.g., normalization) can be performed.

Embodiments can provide an interface for assessing and viewing all of the sensor data. The sensor data can be used to observe prior physical activity. A user can view a presentation of visually interesting charts, graphs, and tables of the sensor data.

Some sensors can monitor how a user performs during a session, e.g., heart rate, blood oxygenation, geographical locations to determine speed, distance, altitude, rates of elevation gain or loss, and the like. The sensors can also relate to other physical conditions that are not related to how a person performed during a session. For example, measurements of weight, sleep, and blood glucose can be used as part of the user model to determine a fitness level, and subsequent uses of the fitness level.

In one embodiment, the sensor data taken during a session can be used to update the session and/or video in real time. For example, a user's motion tracking device sends a message to the client device or a server that the user is doing jumping jacks at an increasingly slow rate after the tenth jumping jack. This user feedback may be used to make changes in real time to the video. For instance, embodiments may edit the currently playing content on the fly (e.g., by changing a configuration file that defines the compilation of the video stream), with the result being to add the audio of a coach yelling "speed up, I'm losing you!". The audio can be added in a seamless fashion.

As another example, the component could be ended early. And, embodiments may also use the feedback to change the next component shown during the current session. Here, with the user tiring quickly during the jumping jacks exercise, embodiments may choose to next show a component with a low level of difficulty following the jumping jacks, so as to not totally exhaust and frustrate the user. Accordingly, embodiments can adapt a session to the user to maximize user progress within a session, or adapt a next session based on the feedback from the current session.

III. Ranking Model and Available Components

As described above, a user and component model module can determine a fitness level for users and for components. The fitness levels are called a rank, and a user can have a different rank for each of plurality of categories of a current exercise program; a component can also have a different rank for the categories. After each session, embodiments can update the model so as you get stronger, the user model can change, which in turn causes more difficult sessions to be created for the user. In other cases, if a user has an injury or is away for a while (fitness level may decrease), this can be observed, e.g., based on lack of usage of the software or explicit user feedback. In such a case, the user's fitness level can decrease, thereby causing easier sessions to be crated. Thus, a user's fitness level can move in both directions, resulting in a more challenging exercise or a less challenging one.

A. Block Diagram

Figure 4:
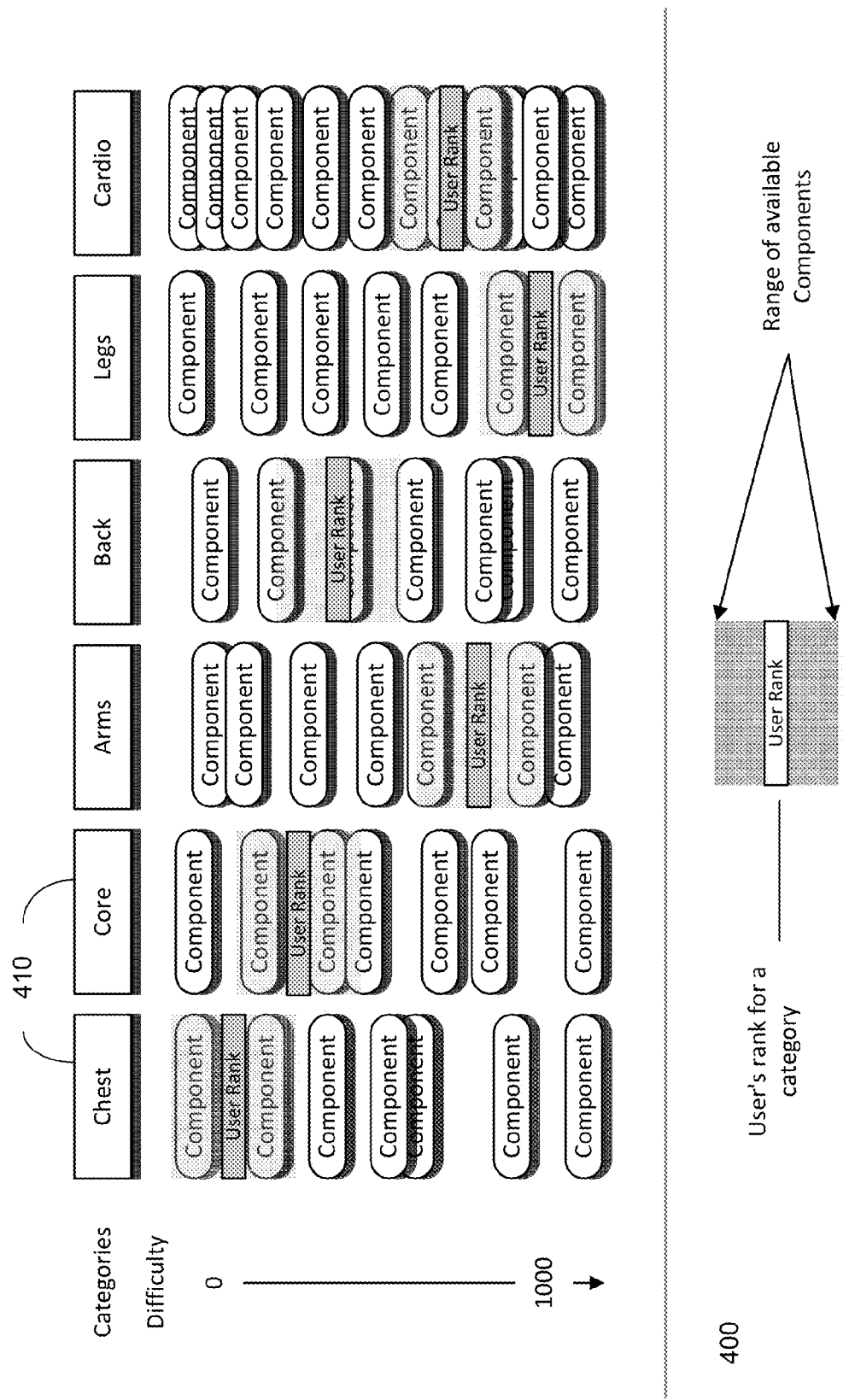
FIG. 4 is a block diagram 400 showing a grid of user ranks and component ranks for a plurality of categories according to embodiments of the present invention.

FIG. 4 is a block diagram 400 showing a grid of user ranks and component ranks for a plurality of categories according to embodiments of the present invention. Seven categories 410 are shown. For each category, a plurality of components are displayed at various difficulty levels. The vertical axis corresponds to a difficulty rank. One user rank is displayed for each category.

As shown, the various components are shown associated with one of the categories. A component may be associated with more than one category, or may just be associated with one category. The association of a component to a category relates to the subject matter of the component. For example, the subject matter of a component for jumping jacks may be categorized as aerobic activity (cardio), and the subject matter of a component featuring pushups content may be categorized as upper body fitness (chest).

A range is highlighted around each user rank. Components having a rank within the specified range of the user rank for the category can be identified as available components for creating a session for the user. As a user can have a different rank for each category, the available components for each category can be customized to the fitness level of the user for the respective category.

As shown, the range of available components is centered around the user rank for a given category. For example, components within +/−50 (or other suitable value) can be identified as available components. In other embodiments, the range can be centered around a different value. For example, if a more difficult session is desired, the range of available components can be centered around a higher rank than the user has. In a similar manner, the center of the range can be decreased of the less difficult session the desired (e.g., as may be desired by the user or determined by the software).

As an example of available components, a user might have a rank of 360 in the chest category. The components of the chest category can include two sets of eight (rank 340), two sets of ten (rank 360), and two sets of twelve (rank 375). If the allowable range is +/−20, then there are three available pushup assignments. There may be other chest exercises that are also available. In one embodiment, the range could be asymmetric around the user rank.

For ease of illustration, only a few components are shown for each category and for each rank. In practice, many components can exist, some of which may have a same or similar rank. And, as noted above, the user rank can be updated. Details of specifying the user rank and the component ranks are provided below.

B. Rank of Components

The components may be categorized depending on its subject matter and its degree of difficulty. That is, a component can have a degree of difficulty within a particular category. If a component is associated with more than one category, the rank can differ for each category. As for degree of difficulty (rank), a component with a duration of fifteen seconds of jumping jacks may be categorized as low-difficulty (e.g., rank 40), whereas two minutes of jumping jacks may be categorized as high-difficulty (e.g., rank 450). The categorization of the subject matter and degree of difficulty may be visualized in a grid, as shown in FIG. 4, in which the columns denote different subject matter (categories) and the rows represent an increasing level of difficulty.

In one embodiment, the component ranks can be set manually. For example, one military push-up can be designated a rank of 10 and twice as hard as a straight push-up (rank 5). The number of reps can then modify the rank according to a linear or non-linear model. In a linear model, the number of reps can multiply the base rank for one repetition (e.g., 10 reps times a rank 10). The number of sets can be additive in terms of rank, thereby preserving a linear model. In a nonlinear model, the addition of more reps can increase the difficulty more (e.g., exponentially) or less (e.g., logarithmically).

In another embodiment, new components can be ranked using ranks of known users. For example, new moves can be introduced into a freestyle area (e.g., a mode where a user can select components and receive a video for a predetermined reps or duration). Then, user feedback can be obtained from the users. As the rank of the users is known, the component can be ranked based on the user feedback and the known user rank at the time of performing the component. The user feedback can be used in various ways. For example, the ranks of users that marked the component as just right could be average. In other implementations, the number of users who marked it as too hard or too easy can be use, e.g., to bump up or down the average determined from those who marked it as just right.

C. Initial User Rank

As described above, a user can perform a fit test as the user's first session. The components of the fit test can be decided based on answers to questions. The system can then choose from a set of pre-defined fit test sessions. The ranks of the components in the selected fit test can be used as the user's initial rank. If the selected fit test is more difficult, the user ranks in the categories would be higher.

The results of the fit test can be used to determine whether or not to increase or decrease the initial ranks. For example, if a user completed a component and marked it as too easy, the user's rank would increase. Alternately, the user did not complete the component and/or mark it is too hard, the user's rank can decrease.

For example, a user's fit test contains a push-up component ranked at 400, and the user completes the component and marks it as too easy. Since the user's rank is initially taken as the rank of the component (i.e., 400), the system assumes that the user and the component were initially matched. But, the results indicate that the user is more advanced. Because the initial guess equal match, the user's rank will increase. In one implementation, the user's chest rank can be 500 after the fit test, as a result of a too-easy multiplier of 1.25 being applied to the initial rank of 400. Other embodiments for updating the user rank are described in the next section.

D. Updating User Rank

The user rank can be updated periodically, e.g., after every session, every N sessions, or some period based on time. In one embodiment, the user rank can be updated by multiplying a current rank by a simple scalar, e.g., too-easy multipliers (greater than one) or too-hard multipliers (less than one). Other implementations can add or subtract instead of multiply.

Other embodiments can be more complicated and utilize a comparison of a predicted (expected) outcome and an actual outcome to determine how much a user rank changes for a given component. The changes for each component of a category can then be aggregated for that category to determine the overall change for a user's rank. As one example, the predicted and actual outcomes can be a win, lose, or tie. In other implementations, numbers can be used to indicate a degree of a win or loss. The evaluation of a win or loss is a computation calculation and is relative to an expectation, and thus can be considered to occur against the system's prediction.

To determine whether a win, loss, or tie has occurred, a predicted score is determined. Then, an actual outcome score is determined. A tie corresponds to the two scores being the same. Thus, a ratio of 1 between the two scores indicates a tie occurred. A tie would be expected if the user's rank is equal to the component's rank. In such a case, the user rank is accurate for that particular component for that particular session. In one embodiment, a variant of the ELO rating system is used.

FIG. 5 is a flowchart of a method 500 for updating a user rank in a particular category according to embodiments of the present invention. Method 500 uses feedback from the user about a particular component that was performed. The user rank is updated based on how the user performed, and based on the user's current rank in the rank of the component was performed.

At block 510, a current user rank, a current component rank, and user feedback about performance of the component are received. The component is associated with a particular category. The user rank is also associated with the same category.

At block 520, a predicted score is determined based on the user's current rank in the category and the component's rank. The predicted score is based on a difference or ratio of the two ranks. If the two ranks are equal, then the predicted score corresponds to a tie. The exact score corresponding to a time can vary, depending on a scale that is used. If the user's rank is higher than the component rank, the predicted score would be that the user would do very well (e.g., a higher score than would be expected for a tie). The higher the score, the better the expectation can be for the user to perform. For example, a user whose rank is 500 is expected to do better than user whose rank is 300 when performing a component whose rank is 200 a raw.

In one embodiment, a raw predicted score is obtained, where the raw score is between zero and one. A transformation function can be applied to the raw score to obtain the final predicted score. The transformation function can act as a normalization.

In one embodiment, the raw predicted score is determined using a logistic function, e.g., $$E = \frac{1}{1 + 10^{(R1-R2)/max}}.$$

raw score E is determined from the user's rank R1, the components rank R2, and the maximum rank. The majority of the raw scores center around 0.5, which would correspond to a tie. Thus, the two ranks would need to have a significant difference for a blowout to be expected. The logistic function is a type of sigmoid function. Other types of sigmoid functions could be used, and other types of functions or probability distributions can be used.

In one implementation, the zero raw scale corresponds to the user not perform in the component, and one corresponds to the user crushing the component. The transformation function can take the range of the raw score and scale it to the range used for actual outcomes. For example, the actual outcomes can have a scale between 0.4 and 1.2.

At block 530, a user score is determined based on the user feedback. The user score is the score of the user's actual performance. The user feedback can include any feedback described herein, e.g., an amount of the component completed, the user rating (e.g., too easy or too hard), sensor data, etc. The user rating can be implemented by using a difficulty multiplier. Each factor can be given a different weight in determining the user's score.

In one embodiment, a user score can be determined for each factor. For example, if the predicted heart rate is at 170 and the user's heart rate is at 170 during the workout, this would considered a tie, where a lower or higher heart rate would be a win or loss, respectively. In another example, staying close to a target heart rate (e.g., +/−a cutoff) can be considered to be winning Losing can correspond to deviating too much in either direction. A tie can be (for example) maintaining the desired heart rate for 80% of the activity.

The scores for each of the factors can be a combined according to a formula to obtain a final user score. In another embodiment, method 500 can be performed for each factor to obtain a change in the user's rank for each factor. The changes can then be combined, e.g., average. Thus, there could be a score for each criteria, such that a different win/loss is determined for each one, and the total can be averaged. Or, the scores for each factor can be combined into a single score, e.g., so that different criteria are weighted more than others.

As additional examples of factors used in determining the user score, factors such as a pace of a running component (e.g., to penalize deviations up or down from a desired pace), the total time, incline, resistance, and a total distance can each be used. Each of the factors can be used to determine a separate user score and then combined. Or, change a user's rank can be determined based on each of the factors, and a total change can be determined from the respective changes.

In one embodiment, the user score is determined by starting with the percentage of completion. A rating multiplier can be used to increase or decrease the score. Depending on certain settings, the user score can be normalized to be higher than the predicted score if the complaint is completed in the user with the component as just right. The settings can be tuned in various ways.

At block 540, the predicted score is compared to the user score to determine an outcome score. The outcome score corresponds to whether or not the user won, lost, or tied, with varying levels of winning and losing been possible. The comparison looks at how the user did versus expectation to decide whether or not you won.

In one embodiment, a continuous value can be used. For example, 0.5 might be a tie. Between 0.5 to 1.2 might be different levels of wins, with higher number indicating a more decisive win (e.g., doing a move very quickly, with little effort). Differing levels of losses can have the same behavior.

At block 550, an amount of increase or decrease is determined based on the outcome score. As part of this determination of the amount increase or decrease, a wager amount can be used. The wager amount can have a first stake that can be won, and second stake that can be lost. For instance, if the predicted outcome was a tie, the winning and losing stakes can be the same (e.g., each 100). In another example, if the predicted outcome is a win, the stake that can be won is less than the stake that can be lost. The same can be true if the user is expected to lose.

The stake corresponding to the outcome (e.g., win or lose) can be scaled by the degree of the win or loss. That is, a percentage of the stake is used to change the user rank. For example, the outcome score can be normalized to be a percentage. For instance, if the outcome score is a difference between the predicted score and the user score, the outcome score can be normalized by maximum possible difference. This percentage can then determine how much of the corresponding stake is lost, e.g., by multiplying percentage against the stake that can be won or lost.

As a result of this wagering technique, if a user performs a component that is way too easy and the user obtains a strong win, the user's rank would not increase very much. But, if the user beats a component that is way too hard, the user's rank will increase substantially. In this manner, the right level can be achieved quicker. And the reverse is true also. If the user is expected to have a strong win and the user loses, the decrease can be large.

FIG. 6 shows a table 600 illustrating an update of user ranks in various categories according to embodiments of the present invention. The first row 605 provides the user rank in various categories. The next 10 rows correspond to different components. The first column 610 shows the category for different components. In each row, the "user" variable identifies the user rank. The "component" variable identifies the component rank. The variable "r" corresponds to reps, and indicates the number of reps that were completed out of a total. A total value of zero signifies that no reps were to be performed, e.g., the component was time-based. The variable "s" corresponds amount of time that the component was performed.

The variable "e" is the predicted/expected score. The variable "a" is the outcome score. The variable "r" is a reward scaling. The final value in each row corresponds to a change in the user rank. The user points wagered (i.e., amount that can be lost) is 103. The amount that can be won is 97. These stakes are consistent with the user having a slightly higher rank (rank 195) than the component (rank 190). The last row is the user ranks in the categories after the change.

In one embodiment, if there are multiple components in a category that are in a session (or otherwise used as part of the same update), the amount of change for each component can be averaged to obtain a total change for that category. For example, if a component at a gain of 50 in another component at a loss of 25, the average would be a gain of 12.5.

E. Updating Component Ranks

In some embodiments, a rank of a component can stay constant, whereas in other embodiments, the rank may change over time. Alternatively, the component ranks can be manually shifted. In other embodiments for the components change, a similar method to method 500 can be used. In method 500, it was assumed that the components in an accurate rank, but that the user rank needed to change. To update the component ranks, the reverse can be assumed, i.e., that the user ranks are accurate in the component ranks need to change.

In one implementation, the updating of the component ranks can happen less frequently than the updating of the user ranks, or also be performed on a somewhat continuous basis. For example, a user rank can be updated after every session, and a component rank can be updated once a month. In the update of the component ranks, the performance of many users for a given a component can be used to update the rank of the component. For example, if many users with higher ranks were not able to successfully perform a component, then the component might need to reduce in rank. Note that if a user performs a component three different times with different ranks, each of those can be used as a different data point, each with a user rank of when the user performed the component. An average amount of increase or decrease can be taken over all users for the component.

F. Confidence Multiplier

In some embodiments, a confidence multiplier can be used to change the user rank or quickly when fewer data points are available. This may occur when a user first against to use the software. For example, an increase or decrease for method 500 can be scaled by the confidence multiplier (e.g., 1.5 to start with), thereby making the change greater. But, after the user has been using software for a long time, the confidence multiplier can reduce towards one.

In this manner, a suitable user rank can be obtained or quickly. The confidence multiplier can also increase, e.g., if the user does not exercise for a while or expresses dissatisfaction with the current user rank (e.g., most things are too easy or too hard).

G. Identifying Available Components

Figure 7:
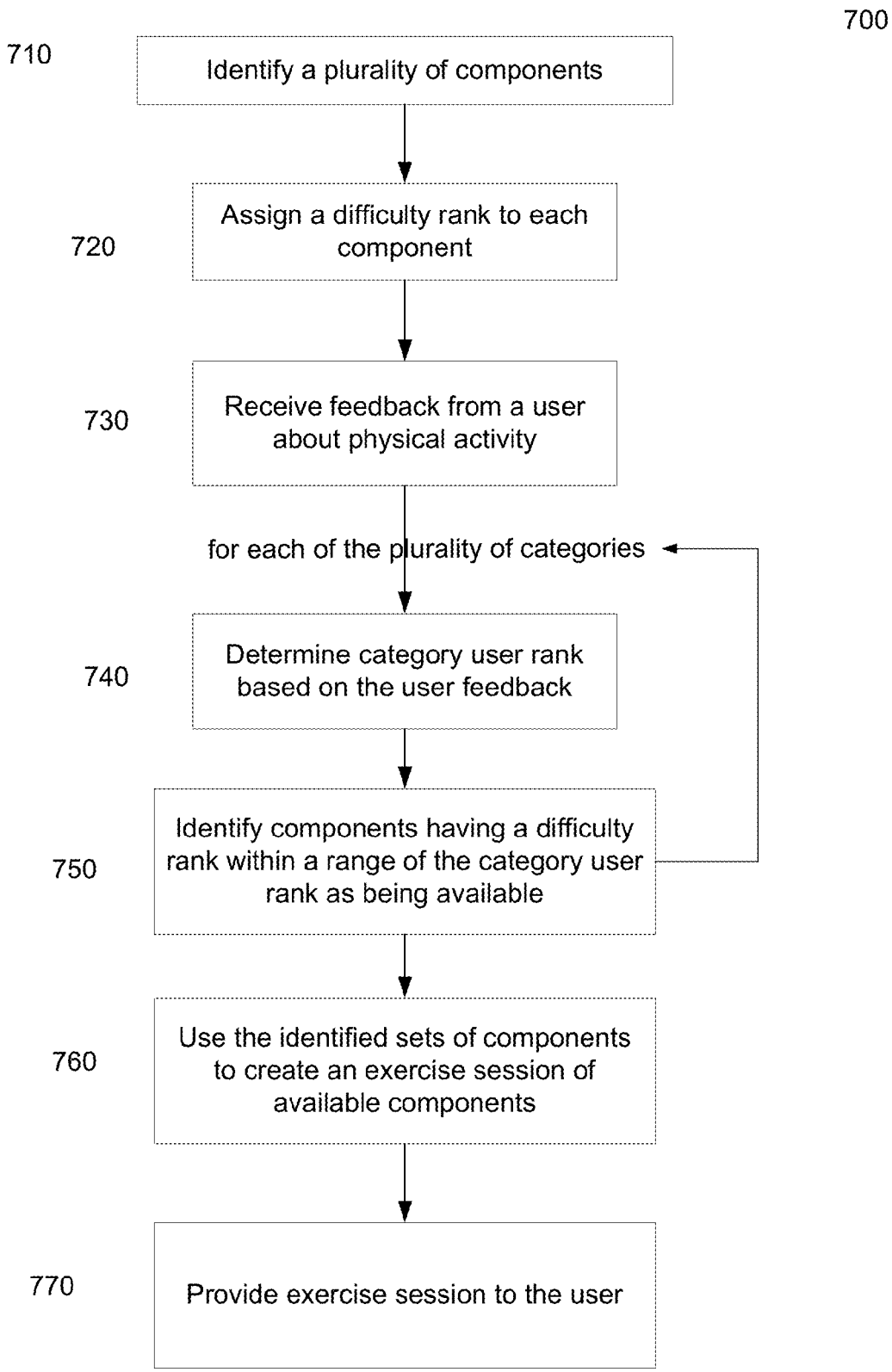
FIG. 7 is a flowchart of method 700 of customizing an exercise session according to embodiments of the present invention.

Once a user rank is obtained and the component ranks are obtained, embodiments can select available components for use in a session. This can ensure that the user is performing appropriate exercises for the user's fitness level. As part of selecting suitable exercises, the selection of available components automatically selects the number of reps for the duration for an exercise. This is because different number of reps correspond to different components, and would have different ranks FIG. 7 is a flowchart of method 700 of customizing an exercise session according to embodiments of the present invention. Method 700 can use the user ranks and the component ranks in certain categories to determine available components, e.g., as depicted in FIG. 4. The available components can then be used to generate a customized exercise session. Method 700 can be performed by the computer system.

At block 710, a plurality of components are identified. Each component corresponds to a respective physical exercise and is associated with one of a plurality of categories. Examples of categories are provided herein. The components can correspond to all of the components of the categories corresponding to a program selected by the user. In other embodiments, only some of the categories are used.

At block 720, a difficulty rank is assigned to each component. The difficulty rank corresponds to a component rank. The difficulty rank can be determined as described above. For example, the difficulty rank can be assigned manually, interpolated based on a difficulty rank assigned to a particular move (e.g., rank of move multiplied by a number of reps), or determined using method 500.

At block 730, user feedback is received from a user about physical activity. The user feedback can take various forms, as described herein. For example, the user feedback can be responses to a questionnaire or other assessment. Other user feedback includes a level of completion of various components, and sensor data about a completion of various components.

Blocks 740 and 750 are performed for each of the plurality of categories.

At block 740, a category user rank for the user is determined for each of the plurality of categories based on the user feedback. The user rank for each of the categories can be determined via embodiments described herein. For example, method 500 can be used. The category user rank signifies that the user has a particular rank in the category, and that the rank corresponds to a particular user.

At block 750, a respective set of components having a difficulty rank within a specified range of the category user rank is identified as being available to determine an exercise session. The range can be as shown in FIG. 4. As described for FIG. 4, the range can be centered at the category user rank or centered at a value that is offset from the category user rank. For example, the system can determine (or the user can request) that an easier or more difficult session be created.

At block 760, the identified sets of components are used to create an exercise session composed of a plurality of available components. The selection of which available components to use is described in more detail below.

At block 770, the exercise session is provided to the user. The exercise session can be provided in various ways. For example, the exercise session can be displayed to the user via a client application, e.g., a client application and a user interface that the user has provided feedback. Method 700 can be performed by server computer, which can send the exercise session to a client device. As a result of using ranks, embodiments may assemble a video containing an advanced arms workout and a beginner's legs workout, when the user has a higher rank in the arms category and a lower rank in the legs category.

In one embodiment, the components can be created for a particular user rank. For example, if a user's rank is 400 and a single repetition move is 40, then a component of a set of 10 can be created. Similarly, a move of a particular time duration (e.g., 1 minute of running) might have a rank of 40, and a component with a 10 minute duration can be created. Such embodiments still fall within method 700 as a rank is assigned to the components.

IV. Determining Session

Once the available components are identified, the available components can be used to create an exercise session. The exercise session includes a plurality of components and can be organized into a particular order. For example, the components of the session can be assigned to a particular slot, e.g., slots numbered 1 to 10 when the session has been components. Various criteria can be used to determine which components to select for an exercise session. For example, components can be assembled to support a limitless number of fitness goals including weight loss, strength gains, or programs for busy lifestyles.

An exercise session can correspond to a particular time period, e.g., one day, one hour, or several hours. In one embodiment, more than one exercise session can be determined at a same time. In this manner, the schedule of exercise sessions can be determined as part of a single optimization process. Since the results of one exercise session can impact the next exercise session, embodiments can generate one session at time and use the results of previous exercise sessions. Embodiments can also generate many sessions as per the schedule, and then update any later exercise sessions after one or more earlier exercise sessions are performed.

In some implementations, a user can manually request a generation of an exercise session, e.g., by specifying availability or other parameters. Exercise sessions can also be generated at specified times, e.g., at midnight the day before the exercise session is to be performed.

A. Block Diagram

FIGS. 8A-8D illustrate the creation of an exercise session according to embodiments of the present invention. In one embodiment, the creation of the exercise session can use available components identified by method 700.

FIG. 8A shows a plurality of available components. Components of the same category are highlighted in a same color (shading). The number of components is only representative, and is limited for ease of illustration. Components 810a correspond to one category (category A), components 810b correspond to another category (category B), and components 810c correspond to a third category (category C). As examples, category A can be chest, category B can be arms, and category C can be cardio.

The number of different categories can be defined based on a selected program. For example, if a user selected a get strong weight training program, then the available components of a first set of categories may be used. But, if the user selected a get fit running program, then the available components of the second set of categories may be used.

FIG. 8B shows a plurality of session templates for a given program. At the time of registering, the user can select a program, as is described herein. A program may have multiple templates. A template can define certain properties of the session. For example, a template can specify when rests are to be taken and the number of categories from which components are to be selected for creating a session. For instance, a rest can be taken after every four components. The template can also assign timeslots two different categories, as is described in more detail below. Thus, each of the four session templates can have a different structure.

In the example shown, session template 820 is selected. The selection of a session template can be based on various criteria. For example, a user may select a preferred template from among a display of multiple templates. If a user does not select a template for a next sessions but has selected templates in the past, embodiments could choose a template used least frequently in the recent set of sessions.

The templates could alternate every N sessions, e.g., use one template for 2 sessions, a next template for the next 2 sessions, and so on until all sessions have been used, and then the process can repeat. A particular program can specify different templates to be used at different times in the program. For example, a program can be 8 weeks long, and each template can be used for two weeks before the next template is used. Other embodiments can select a template at random, e.g., to avoid complacency, to provide uniform coverage of templates, to provide a rigorous schedule ("hell week") at certain times, and to emphasize categories that a person has a lower rank.

FIG. 8C shows the selected session template 820 and selected categories 830a-830c, which correspond to sets of components 810a-810c. The selection of the categories can be restricted by the selected template, which can specify the number of categories to be used. In this example, session template 820 specifies that three categories are to be used. In one embodiment, the user can specify categories or other criteria (e.g., categories not to use), while other embodiments can have an automated process. In various embodiments, the automated process can use conditional logic to determine a result based on various criteria and can use an optimization process.

The selection of the categories can be based on various criteria, such as categories used in previous sessions, a preference for certain categories to be grouped together, and any preference within a program to emphasize certain categories over other categories. For example, if the session of yesterday used categories D and E, then there might be a preference not to use those categories.

In one embodiment, each category can be assigned a score, e.g., based on criteria described herein. A higher score can designate a higher preference for that category. A first category can then be selected based on the relative preferences. For example, a higher probability of selection can correspond to a higher score. Once a first category selected, new scores can be assigned for the remaining categories, which may allow a preference for certain categories to be used in a same session.

Besides having preferences for certain categories, certain categories can be excluded or have a reduced score, e.g., as the user might have indicated an injury for a body part corresponding to a particular category. Other constraints can include that two categories must be used together.

FIG. 8D shows a selection of components to fill in the selected template. The left panel of FIG. 8D shows an expanded view of session template 820. As shown, session template 820 has 16 timeslots 840. Each time slot is to be assigned a particular component of a particular category. In this example, the first two timeslots 841 and 842 are designated for cardio. Thus, certain timeslots of a template can be required to have a specific category, and other time slots can allow selection. The third time slot 843 corresponds to a first category, and is marked with an "A". Other timeslots that are required to have the same category can be marked with the same label, as is shown. The fourth time slot 844 corresponds to a second category, as marked with a "B". A rest period exists between blocks of four components. Other templates can have a different organization structure.

The right panel of FIG. 8D shows a final session 850. The timeslots are shown filled with available components. In this example, category 830a was selected to correspond to timeslots marked with "A" in session template 820. Category 830b was selected to correspond to timeslots marked with "B" in session template 820. Once certain categories are assigned to certain timeslots, specific components from the designated categories can be selected.

The selection of which components to use from the selected category can be based on various criteria, such as components used in previous sessions, the aggregate component score of the selected components, and a target difficulty for the session. In one embodiment, a target difficulty rank can be designated for particular category. As examples, the target difficulty rank can be the user rank or an offset from the user rank, where the offset increases or decreases the difficulty. Examples of when the target is offset from the user rank include when the user did not sleep well (e.g., as determined by sensor data) or the user has not had a hard session in a while (or too many easy ones) or for plateau busting. The offset can change which components are available, e.g., by shifting the range upward or downward in FIG. 4. The amount of offset can be predetermined (e.g., only 25 above or below) or allowed to vary.

The selected components can be chosen to have an average rank that are sufficiently close to the target difficulty rank (e.g., +/−5 or other cutoff or threshold value). The selection of the components to provide a desired average can be performed in various ways. For example, one component can be chosen and if the component is below the target then a next selected component can be above the target. A brute force method could try various permutations of components until one is within a cutoff of the target rank. If the average is too high, then the highest ranked component can be dropped and another selected. A similar process can be done if the average is too low.

In one implementation, the components are selected without regard to order. Thus, in this example, four components of category 830a can be selected for including into session 850. These four selected components can be randomly assigned to any corresponding time slot. In another implementation, a particular component can be selected for a particular timeslot.

There can be a preference for not choosing a same component twice for two slots of a session. However, if there are not a sufficient number of components (e.g., only 3 available components in a selected category), or if other components have a low preference or have been excluded, then a same component can be assigned to more than one time slot. As with selecting categories, a preference score can be assigned to each component based on user's preference, components used in previous sessions, a preference for variety, and other suitable criteria. The top components can be searched first to see if their average can satisfy the target rank.

B. Method

Figure 9:
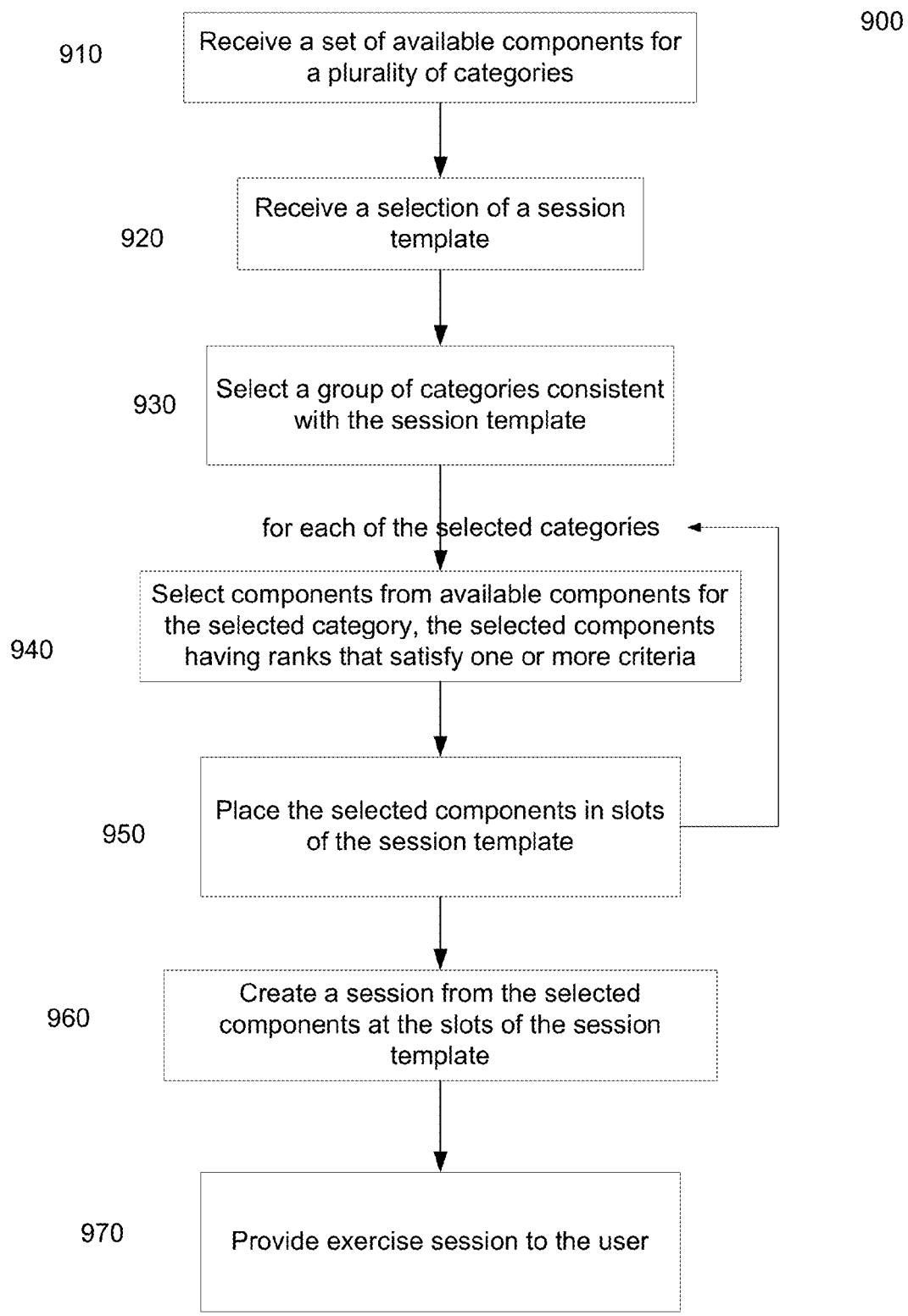
FIG. 9 is a flowchart illustrating a method 900 of customizing an exercise session according to embodiments of the present invention.

FIG. 9 is a flowchart illustrating a method 900 of customizing an exercise session according to embodiments of the present invention. Method 900 can use the available components determined and method 700. Method 900 can also use the user ranks and the component ranks in certain categories. Method 900 can be performed by the computer system.

At block 910, a set of available components is received for a plurality of categories. Each component corresponds to a respective physical exercise, and each available component has a rank for a corresponding category. The number of categories can correspond to a program selected by the user. Aspects of the components and ranks are described above.

At block 920, a selection of a session template is received. A session template specifies a number of categories. For example, the session template can specify that three categories are to be used. The session template can also require one or more specific categories (e.g., cardio). The session template can specify a number of slots for components for each category. For example, the session template can specify that for slots are to be used for a first category that is to be named later. Further examples are described above for FIG. 8.

At block 930, a group of categories is selected consistent with the session template. For example, if the session template specifies that a first category is required and that two other categories are needed, the group of categories includes the first category and two other categories. Various criteria can be used to select the categories that are not required. Example criteria include categories used in previous sessions, a preference to use one category with another category, user preferences, and other suitable criteria. Other example criteria are described herein.

Blocks 940 and 950 are performed for each of the selected categories.

At block 940, components are selected from available components for each of the selected categories. The selected components for particular category can have ranks that satisfy one or more criteria with respect to a rank of the user.

One example criterion is that the average rank of the selected components is within a cutoff of a target value (e.g., the user rank or an offset from the user rank).

At block 950, the selected components are placed in the slots of the session template. The slots can be ordered or not ordered. In embodiments where the slots are not ordered, the selected components for a particular category can be placed into any slot. In embodiments where the slots are ordered, the components can still be placed into any slot or a component can be selected for placement into a particular slot. The selection of the component for a particular ordered slot can be based on various criteria, e.g., to ensure that to higher rank components are not placed back-to-back.

At block 960, a session is created from the selected components at the slots of the session template. The session can include other items besides the selected components. The session can include specific rest periods. The session can include other information to be provided, such as a description of each of the components. A session can also include video content, as is described in more detail below.

At block 970, the exercise session is provided to the user. The exercise session can be provided in various ways. For example, the exercise session can be displayed to the user via a client application, e.g., a client application and a user interface that the user has provided feedback. Thus, a user device can create the exercise session and provide it to the user. In another embodiment, a server system creates the session. Thus, method 900 can be performed by server computer, which can send the exercise session to a user device.

FIG. 10 shows an example session that can be provided to a user according to embodiments of the present invention. All components are shown, which may be all or only a portion of the session. Each component as a name or short description. Each component also has a number of reps or time that the component is to be performed.

C. Criteria

As described above, various criteria can be used for the selection of a category and the selection of components within a category. This section describes other criteria that may be used in addition to the criteria described in other sections.

In one embodiment, the ordering of the components in a session can be determined based on various criteria. For example, two components may preferentially be performed in sequence, or constraints can specifically prohibit or discourage two components from being performed in sequence. One instance is where a component belong to a first category, but has a subcategory (e.g., minor involvement of a different body group). Then, the component would generally not be not in succession with a component from the subcategory. For example, a first back exercise component can also engage legs, and thus the algorithm for selecting the order does not include a legs component after the first back exercise component.

The order of the components can also impact which components are selected. In such an embodiment, a score can be assigned to the order of components for a possible session. The score can be analyzed to determine if it is acceptable (e.g., too low). If the score is not acceptable, different components can be selected. A lower score can be caused by two components that should not be performed in sequence. Or, a lower score can result from multiple components in sequence that have a higher rank than the target rank.

Other criteria can include how long are your workouts going to be and a preference for complexity of sessions (e.g., how many categories or different components are desired). One embodiment can use alternate axis for selection of components. For example, one yoga session may revolve around "hip flexibility" which might be a category. Another session may focus on "relaxation", which could pull components (e.g., still within your range of user rank) from all categories as long as the components are tagged as "relaxation".

V. Generating Customized Video

In certain embodiments, a customized video can be generated that corresponds to a session. In one implementation, video and audio data recorded during a content production process may be edited to produce a plurality of visually and aurally seamless looping iterations that may be broken down and categorized depending on their subject matter and degree of difficulty. This assembly of fully customizable, targetable exercise or other movement-related content can respond to user data, which gives users relatively low-cost access to the content that they need to stay engaged and motivated to achieve their fitness health goals, when they need it.

The recorded video and audio data can be captured in a manner that allows it to be manipulated to produce content that may be customized (e.g., in real time) and targeted to specific viewers based on a multitude of factors, including data received from the user and the user's devices. As an example of a customized video, one user may need a program depicting 15 pushups, while another user may need a program depicting 50 pushups. Both videos can be created from the same recorded video. This same customization can span over the course of an entire curriculum.

A. Intro

The video and audio data recorded and or generated during a content production process described above may be manipulated to produce an infinite number of visually and aurally seamless customized videos corresponding to customized sessions. The process can be referred to as "atomization," and the product of which can be referred to as an "atomized video" (or atomized program).

Consider the example of a trainer/coach recorded doing jumping jacks, for a duration of thirty seconds. By atomizing the footage from multiple cameras, many iterations of video and audio content (Atomized videos) can be produced that appear to show the trainer seamlessly performing jumping jacks for one minute, three minutes, thirty minutes, or other periods of time. Such atomized videos would not simply slow down or speed up the footage to fit these amounts of time; rather, they can be edited and looped in a way such that a different number of jumping jacks would be shown, depending on the length of the video.

The atomization process can utilize decision points within various video tracks. For example, multiple cameras can be used to obtain various video clips (tracks) of the trainer performing an exercise move. The video tracks can be analyzed to identify decision points within the tracks. These decision points can be used to switch between video tracks so as to provide the desired amount of exercise motion in the video.

B. Method

Figure 11:
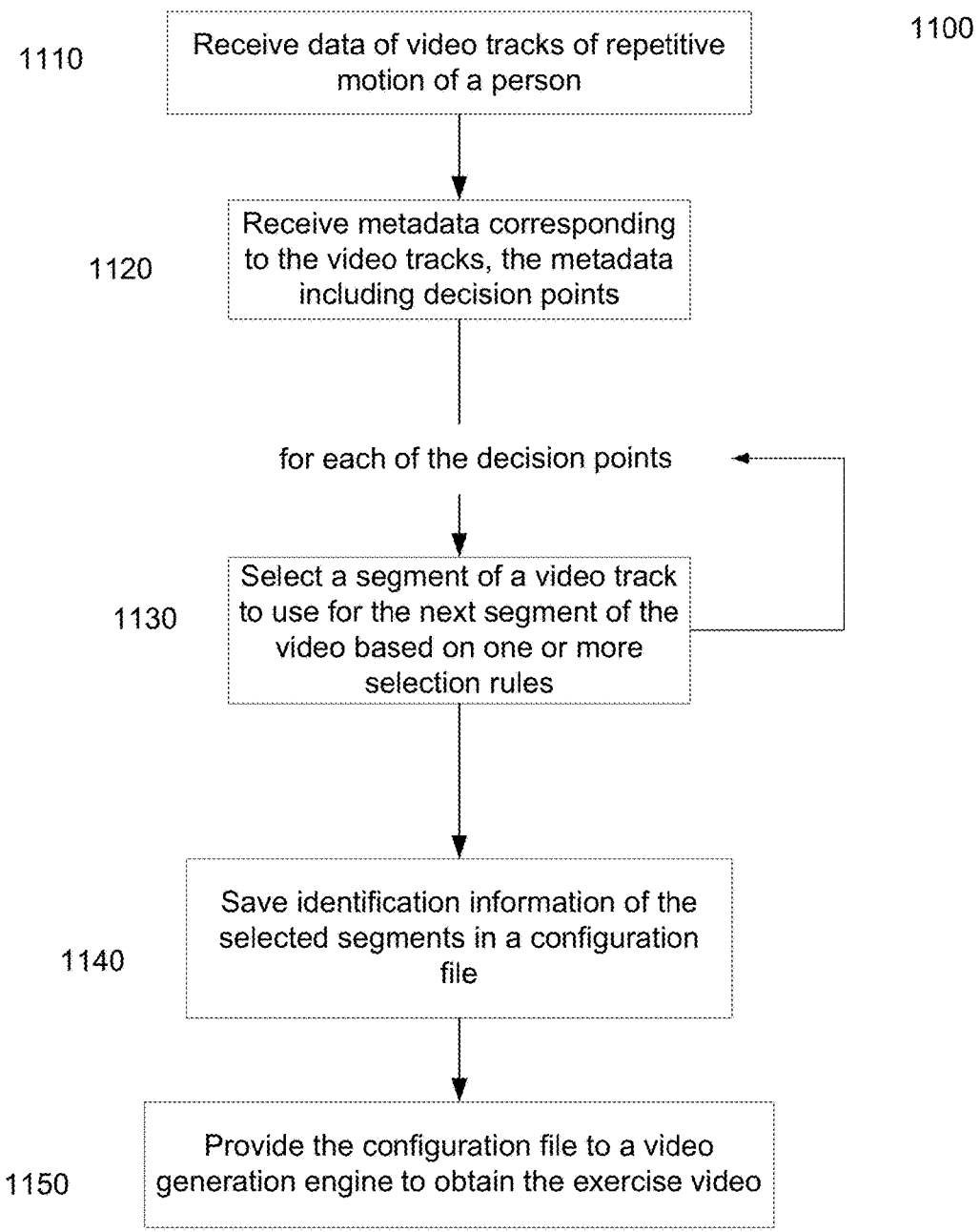
FIG. 11 is a flowchart illustrating a method 1100 of generating a customized exercise video according to embodiments of the present invention.

FIG. 11 is a flowchart illustrating a method 1100 of generating a customized exercise video according to embodiments of the present invention. Method 1100 can be used for preparing a video of a particular amount of a move. For example, the amount may be total number of reps or total amount of time that the move is displayed. The move is repetitive, and thus the video can appear seamless when a proper combination of multiple video clips is performed.

Method 1100 can be performed by a computer system, such as a server or client device, as can other methods described herein.

At block 1110, data of a plurality of video tracks of repetitive motion of a person is received. For example, a person may be performing push-ups. Each video track can correspond to a different camera used to capture the repetitive motion of the person. The various cameras can be at fixed position or moving, or combination of both. The data can be organized in any suitable fashion. The data may also include audio tracks, as is described in more detail below.

At block 1120, metadata corresponding to the plurality of video tracks is received. The metadata can be obtained from a prior processing of the video tracks and then received by a computer system. In another embodiment, the computer system can process the video tracks to determine the metadata. Processing the video tracks is described in more detail in sections below. In some embodiments, the video tracks themselves are not needed and only the metadata and other data may be used.

The metadata includes times of decision points in the repetitive motion for each video track. The decision points can correspond to times that the final video can switch from one video track and the video track. An example decision point is the end of an intro section. For example, the trainer in the video can introduce the move, which may include a short description and a sample video excerpt of one rep. Another decision point can be a particular position in the rep. For example, the top or bottom (or both) points in a push-up. The decision points can allow the video tracks to be synchronized.

At block 1130, at each of a plurality of the decision points, a segment of one of the video tracks is selected to use for a next segment of the exercise video based on one or more selection rules. For example, a decision point can be the beginning of each video track. At this decision point, one of the video tracks can be selected. In one embodiment, a segment of the selected video track would be displayed in the final video after the intro. The segment can be until the next decision point is reached i.e., a segment can correspond to a portion of the video track between decision points.

In some implementations, the selection can be made for multiple decision points at the same time. For example, a particular video track may have metadata that specifies that the next six segments are to be included in the first segment is chosen from the video track. Thus, the decision is not need to be made independently for all the decision points in the metadata, but only a plurality of them. Accordingly, at each of the plurality of decision points, the decision can be made as to whether to stay with the same video track or to change to a different video track for the final video.

The switch at a first decision point to a different video track can be to a different decision point, the one that corresponds to the first decision point. For example, the first decision point can correspond to the start of the 7th push-up. However, the person can be performing at the start of the $2^{nd}$ push-up in the video track that is being switch to. In this manner, control can be passed back and forth between decision points of the various video tracks and certain decision points can be reached more than once. At each decision point, the decision can be made whether not to stay that the same video track or change to a new video track, in which corresponding time location in the new video track is to be used.

The one or more selection rules include a total amount of repetitive motion to be performed. As examples, the total amount can be a total number of reps to be performed or total amount of time that the repetitive motion is to be performed. The total number of reps can be used in making the decisions at the decision points so that the final video has the required number of reps. As part of the selection rules, the number of counts from one video track to another can be minimized. For example, the desired number of reps is 20, and the video tracks include a total of eight reps, then a minimum of two cuts between video tracks must be done.

Other selection rules can include positive and negative indicators. These indicators can be part of the metadata for a particular video track and can correspond to one or more decision points of the video track. A positive indicator can indicate a preference for using a particular video track at one or more decision points. A negative indicator can indicate disfavor for using a particular video track at one or more decision points (e.g., a segment of a video track can be blocked out). At some decision points, there can be no preference. In such a case, the selection rules can be used, which may include selecting randomly or a video track not selected previously.

At block 1140, identification information of the selected segments is saved in a configuration file. The identification information can simply be a timestamp (i.e., start time for when the selected video track is used) and a number corresponding to the selected video track. The identification information can include source track, destination track, insertion time, start time, and end time. The configuration file can include all of the information necessary to combine the video tracks to the final video. The actual video tracks can be stored in other file(s).

At block 1150, the configuration file is provided to a video generation engine for combining the identified segments to obtain the exercise video. The video generation engine can be a hardware or software engine (or combination thereof) that is part of the computer system that determine a configuration file. In another embodiment, the video generation engine is part of a different system. For example, the video generation engine can be on a user device and a server system can generate the configuration file. The client device can receive the configuration file and assemble the video tracks to form a video stream or a complete final video.

As the decision points can correspond to particular positions of the person performing the motion, a switch from a first video track to a second video track can be seamless. The person is at the same position in the second video track as the person was just at in the first video track. Therefore, a judicious choice of decision points (along with a synchronization of the video) can allow any number of reps or duration to be displayed in the video.

C. Obtaining Video/Audio

The plurality of video tracks can be obtained from a multi-camera shoot of a person performing the repetitive motion. Each camera can be shooting at a different angle. One camera angle can be a top-down view, a front view, either side view, or back view. The camera angles can also change as the cameras can move. In one embodiment, three or four video tracks are used An introduction segment can also be obtained. For example, a coach can introduce the move, e.g., a video the coach saying "okay now we're going to do pushups." There could be one or multiple versions of such introduction for a particular move. The same introduction can be used for multiple components that correspond to a same move. As part of introduction, a preview sequence can show the user what the user is about to do, so the user can get ready for the exercise component.

The video charts can be of more than one person. One or more subjects (which may be human beings, computer-generated images, and or other figures, and hereinafter referred to as a "Model") can be simultaneously recorded from different angles by multiple video recording device. In the case of computer-generated images, it is rendered from multiple viewpoints. Other example camera angles can include: a wide angle view of the scene, a close-up of certain body parts of the Model, a full-frame view of the Model, and dynamic viewpoints from two cameras that move around the Model.

Certain embodiments may allow users to create customized videos themselves, featuring video and audio (including music) content of the users' choice. This feature allows for an even greater amount of customization based on the needs and desires of the user. Users may be able to share such user-created videos with other users. For instance, User A may create a video for User B, who happens to be a longtime workout partner of User A. User B may be more motivated to engage in physical activity with a customized video created by User A, based on their relationship. Additionally, users may rate and review videos, and such ratings and reviews could be made available to other users, to help them decide which video to choose from. The raw video of a selected coach, can then be used to assemble the customized video for the user's session.

D. Processing Data

The video and audio content that is recorded or generated as previously described can be arranged in a timeline in a computer software program to edit the video. The content from each video and audio recording device may be shown as individual tracks in the program, and arranged such that they are in sync with each other (i.e. when the content is played from within the software, all of the video and audio feeds play the same moment in time from the original recording session, at the same time). Certain parts of the video track marked out, e.g., when one camera begins early in catches the Model walk out and getting in position.

The content may be time-coded, using a feature such as chapter marking, to categorize or denote what is depicted. For example, a chapter marker (decision point) may be inserted at the beginning of the content to denote an introduction to the exercise by the Model. Another chapter marker may be inserted at the transition point from the introductory segment to the actual exercise. Additional chapter markers may be inserted at the beginning of each repetition of the exercise that follow the first one. And a chapter marker may be inserted at the end of the last exercise repetition, to denote a transition point from the exercise to an "outro" segment depicting the Model finishing the exercise.

Portions of the content may be flagged according to the desirability of the portions to be used in the final video. For instance, if the Model made a mistake during one of the exercise repetitions, the content depicting this flawed footage could be flagged as undesirable. In another example, one camera may move in front of another camera so that footage is not usable. Additionally, content depicting perfect form during the exercise repetitions could be flagged as very desirable.

The content and added data such as chapter markers may be exported from the computer software to produce be a lossless, high resolution video file with audio, as well as a file that includes the added data, which may be encoded in XML format (Extensible Markup Language or other markup language that defines a set of rules for encoding documents in a format that is both human-readable and machine-readable).

Figure 12:
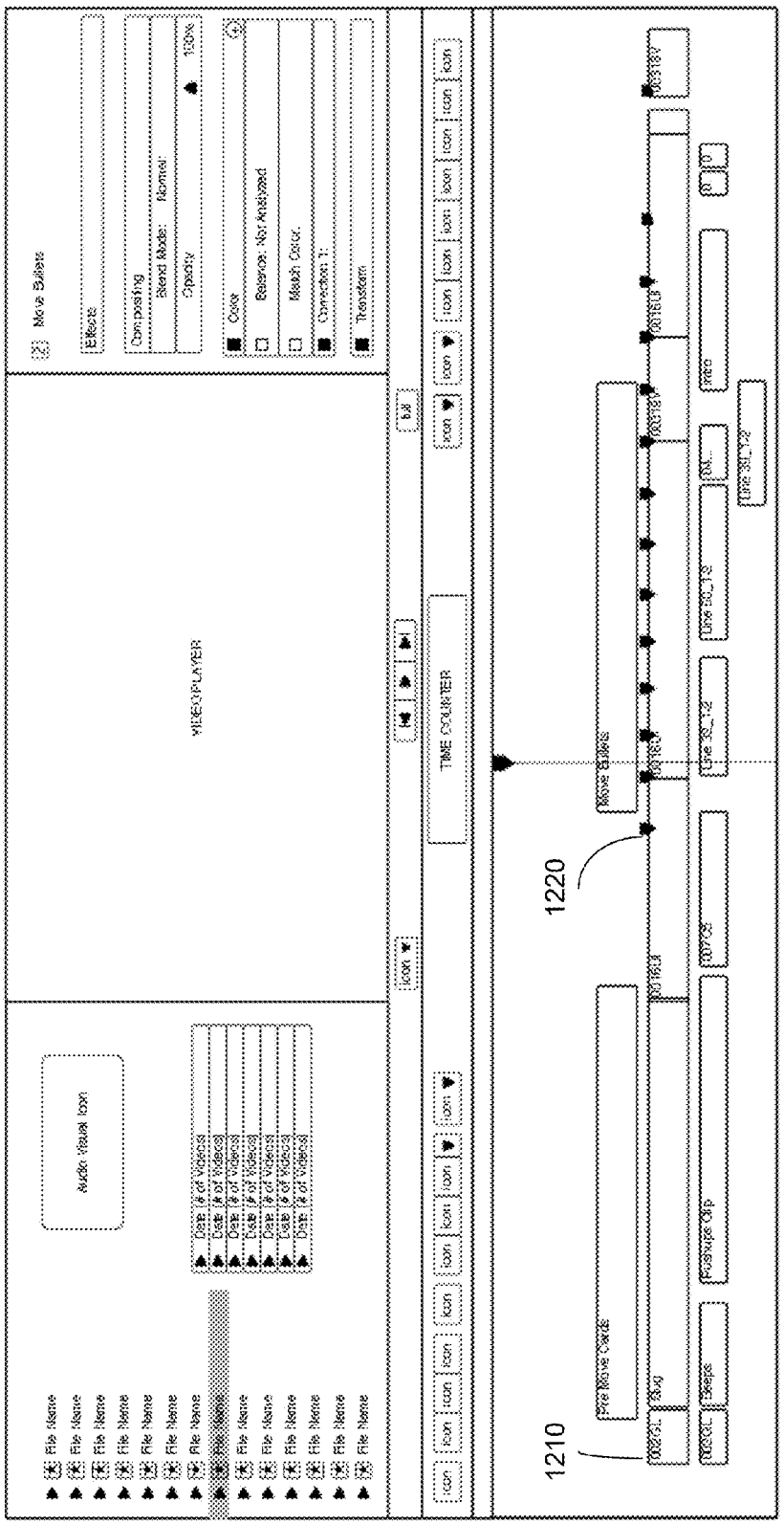
FIG. 12 shows a user interface 1200 of a video editing program that may be used according to embodiments of the present invention.

FIG. 12 shows a user interface 1200 of a video editing program that may be used according to embodiments of the present invention. One or more video tracks 1210 can be processed according to a user's input. The user can mark decision points 1220 in a video track. The metadata can include the decision points and any other user input provided. The metadata can be stored in metadata file, which may be stored separately from video tracks, but associated with the video tracks. Any of the information in the metadata file can specify a particular time location in the video track that corresponds to the metadata being added (e.g., whether the time location is good, bad, there should be used as a decision point).

Once the video tracks has been processed, an uploading tool can receive the video tracks with the desired level(s) of video quality (e.g. 480 p, 720, 1080 p) and the metadata file (e.g., a post-process XML file). The uploading tool can upload them to a server, where the files can be accessed to form a customized video. Thus, the metadata file can go into the system and be associated with the move. The server knows that the move "pushups" has this file from the content server and know the metadata about what is inside the video file(s). The combination of the video file and the metadata file can be referred to as a media asset. The video editing interface (or different software) can also be used to create metadata for audio tracks.

Figure 13A:
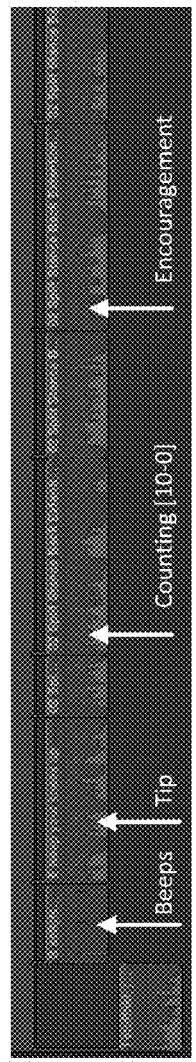
FIG. 13A shows a diagram for meta-tagging audio corresponding to the video tracks according to embodiments of the present invention.

FIG. 13A shows a diagram for meta-tagging audio corresponding to the video tracks according to embodiments of the present invention. Various tags are added at different times and the audio track. In the example shown, a tag 1305 is added at a time location to indicate beats are to be added to prepare the user for the start of the upcoming move. Tag 1305 can be a required tag, as the beeps may be required.

Tag 1310 identifies a time location for a tip. Such a tag can specify a particular time location or a range of time locations that can be acceptable. For example, certain parts of the audio track can be allowed to receive certain optional audio (e.g., tips) and other parts of the audio track can be restricted from receiving optional audio.

Tag 1320 identifies a time location for an encouragement. Such a time location can be identified based on user feedback. For example, sensor data (e.g., a motion capture sensor) can identify that the user's motion falls off at a certain point in previous sessions, and thus an encouragement can be inserted for next session. In a real-time embodiment, the sensor data for the current session can be analyzed and the encouragement can be added for the current session.

Figure 13B:
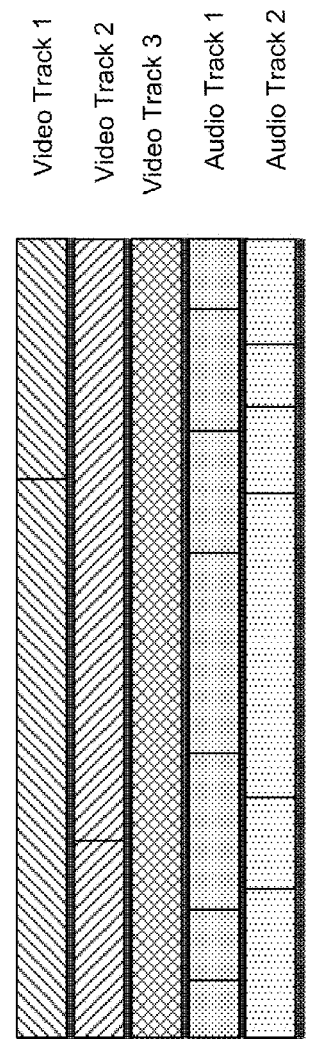
FIG. 13B shows a diagram 1350 of different video tracks and audio tracks according to embodiments of the present invention.

FIG. 13B shows a diagram 1350 of different video tracks and audio tracks according to embodiments of the present invention. This combination of video and audio tracks can be packaged into a single media asset for a particular move. Thus, each move can be bundled into a single file with several tracks. The meta-data about the layout of this file can be sent up to the server for use in online-editing. The video tracks can be produced at multiple resolutions. The media asset can contain everything needed to play the move.

E. Selecting Media Assets

Figure 14A:
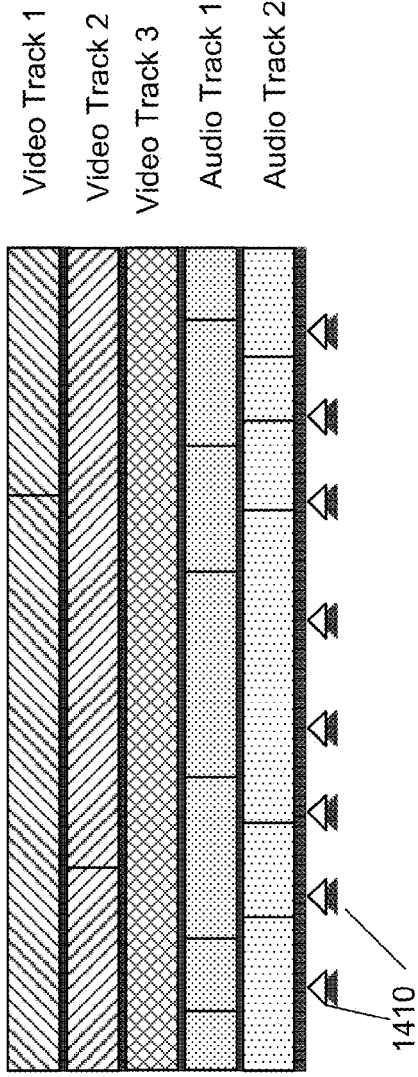
FIG. 14A shows a diagram of a media asset 1400 that can be used to create a customized video according to embodiments of the present invention.

FIG. 14A shows a diagram of a media asset 1400 that can be used to create a customized video according to embodiments of the present invention. Media asset 1400 includes the video tracks audio tracks, as well as metadata. The metadata includes decision points 1410. The media asset can be analyzed according to selection rules for a specific exercise session to provide a customized video for the exercise session. The selection rules can use information specific to the user for which the customized video is being generated.

Figure 14B:
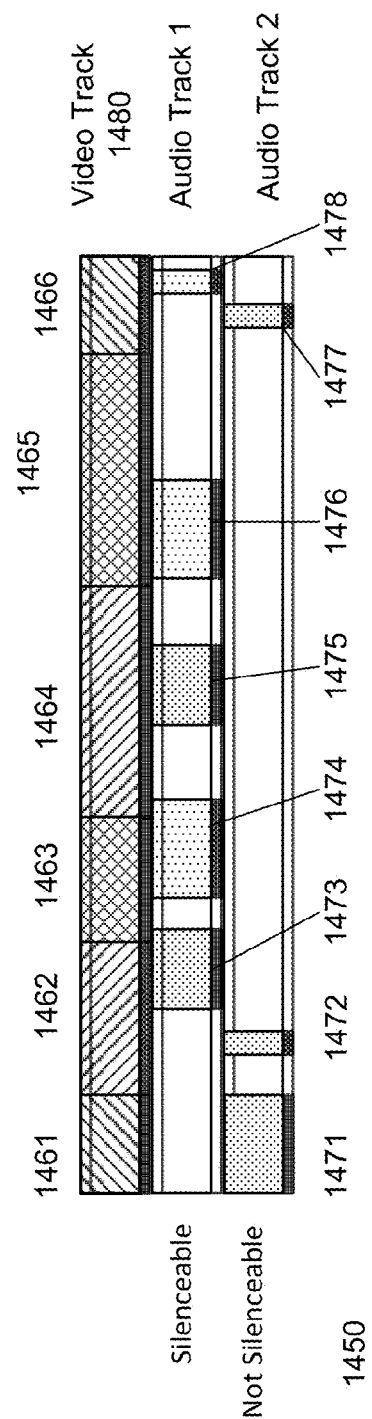
FIG. 14B shows a diagram of the customized video 1450 according to embodiments of the present invention.

FIG. 14B shows a diagram of the customized video 1450 according to embodiments of the present invention. Customized video 1450 corresponds to a destination timeline that the user sees. Customized video 1450 can be created using a method 1100. The decision points 1410 and selection rules can be used to determine which video tracks to use for the final video track 1480.

A first segment 1461 of video 1480 is selected to be taken from video track 1. A second segment 1462 a video 1480 is selected to be taken from video track 2. A third segment 1463 selected to be taken from video track 3. A fourth segment 1464 is selected to be taken from video track 2. A fifth segment is selected to be taken from video track 3. And, a sixth segment is selected to be taken from video track 1. The video 1480 can be determined by performing multiple passes over the video tracks of media asset 1400 to estimate the determination of which tracks to use for each segments at the decision points.

As shown, the media asset is shorter than customized video 1450, as evidenced by a shorter timeline on the horizontal axis. Customized video 1450 can be longer such as a combination of the video tracks. Different parts of the video tracks can be placed at various points in video 1480 to display any amount of the exercise motion.

The audio track can be assembled in a similar manner. In some embodiments, two or more audio tracks can be obtained. For example, audio track 1 can correspond to an audio track whose volume can be decreased (silenceable). And, audio track 2 can correspond to an audio track was volume cannot be decreased (not silenceable). The segments of the audio tracks to not have to fill up the entire timeline, a certain parts of the timeline can be silent. The segments 1471-1478 correspond to different ones of audio tracks 1 and 2. These different audio tracks can correspond to video obtained from any of the cameras that obtain the video. The audio tracks can also include added audio, e.g., tips or encouragement, from stock files.

To assemble a customized video, the data may be manipulated automatically with the assistance of a microprocessor. Depending on what data is added in the previous steps (such as chapter markers) a customized video may be assembled according to that added data. For instance, a customized video may be desired that shows an introduction (e.g., selected from one or more intros), a set of exercise repetitions, and an "outro" (e.g., selected for one or more outros). Certain data can be extracted from the uploaded data, e.g. the chapter markers and the original source camera for each edit. Using the chapter markers added in the previous steps, a customized video can be assembled to show those desired portions. Content that is flagged as undesirable in previous steps will not be available to be added to the customized video. The exercise portions can be looped for desired length, and footage from the different recording devices can be used to ensure seamless looping rather than jerky cuts.

In one embodiment, the decision as to which video track to use at a particular decision point (and potentially which part of the video track) can be performed using a weighted depth first search. A score can be assigned to each of the video tracks, where the score predicts a success. The success can be measured by a quality of the destination video track (e.g., as measured by metadata). Various time locations within the video track s can be given scores, so that the decision also includes which point in the destination track is to be used.

The selection rules and the scores can account for how many more reps are to be performed. For example, the second to last rep of the destination video track would not be selected for switching if 8 more reps are needed. Other selection rules can include a desire to get different camera angles after a certain number of reps. As mentioned above, the number of cuts can be minimized, so that when 50 reps are needed and the video tracks have only 10 reps, one is not seeing the same footage too much or being switched back and forth quickly. In another embodiment, the cuts (switch from one video track to another) can be made after a predetermined number of reps or predetermined duration.

The decision can be broken down into different parts. For example, a cut can be identified at a particular decision point. Then, which destination video track to use can be a separate decision. The decision of the decision video track can account for the position of the current camera and a possible destination, and not use the possible destination camera of the two cameras are too close, as then the transition may not be seamless.

F. Combining

Once the configuration file identifying the timelines for the customized video is obtained, the configuration file can be used to create the customized video. The configuration file can identify the segments of the video tracks needed at particular times in the final timelines for the customized video. Thus, the configuration file can provide the instructions for assembling content and playing the customized video, e.g., seek to this time in this video track, play a particular segment, then seek to another location in another video track, and so on. Thus, the combination of the configuration file and the media asset (video tracks and audio) can provide the customized video.

This assembly process may also be done automatically with the assistance of a processor. After the uploaded data reaches the server, an customized video can automatically be generated given certain built-in parameters that are designed with the desired end product in mind (e.g. a video with an introduction, exercise repetitions looped using the desirable portions of the footage and cut from the different viewpoints of the various recording devices, and an outro).

The media asset can reside on servers, and the configuration file can reside on the user device or also on a server. The configuration file can be generated in batch (e.g., at night) or in response to a user request. Once the configuration file is obtained, a final video can be generated right away, or the configuration file can be saved for later use. The user can elect to generate the customized video using the configuration file for saving or for streaming.

G. Audio

Additionally, audio may be recorded during the video recording session, as well as in separate sessions during which no video is recorded, e.g., utilizing a multi-track recording system. For instance, the coach's voice may be recorded during a jumping jacks recording session. Additionally, the coach's voice may also be recorded on its own before or after the jumping jacks recording session. Timecode may or may not be applied to audio recorded before, during, and or after the video recording session The audio may be time-coded similar to the video; a chapter marker may be added to the instructional dialogue, to the counting of the exercise repetitions, to exercise tips, encouragement, "outro" dialogue, etc.

Certain audio may be designated such that it will always play during playback (such as beeps that provide a cue for the user to stop and start). Audio may be designated for toggling on and off by the user before or during playback (such as the Content Creator's voice). Also, certain audio clips that are categorized in a certain way may be easily added to the video in appropriate places. For example, an audio clip of the coach giving encouragement may be categorized as such, and therefore can be easily added to the video in a spot where such encouragement may be useful to the user (such as near the end of the exercise repetitions, or in response to feedback from the user that indicates the user is falling behind in the exercise).

An example of where multiple tracks may be on the destination timeline is to allow users to adjust the volume of them independently. In embodiment, a user can adjust the volume of the coaching independent of the audio queues (beeps, etc). A user can turn off or on different types of audio. Some segments like beeps can be required, and volume can be restricted. Other audio can optionally be added, e.g., to say "good job". Other audio includes tips (e.g., "keep your elbows straight"), encouragement (e.g., "keep going", "don't stop now"), and jokes. Location specific audio can include a countdown.

The decision as to which audio to include at which points can be done at least partially via an optimization technique. Different audio clips can have different guidelines for selection rules. There can also be overriding, tunable guidelines. For example, the 'beep' track can be designated as always backed up against the start and end of the move, so as to cue the user when to start and stop. A guideline can be that 40% (or other percentage) of the total time has audio, and/or a specific percentage of coaching. Once the system fills in the required elements (beeps, instructions, etc), the system can fill in the remaining quota. Embodiments can maintain variety, randomization, and roughly equal spacing for remaining audio to be added.

Whether to include encouragement can be determined based on previous session. For example, if the system knows that that the user has failed for the last three sessions (or other number of sessions) just before the final rep, an encouragement can be added. If a component is done twice in one session, then a different intro can be selected.

VI. Audio

In some embodiments, a custom sessions might only include audio. Embodiments described below can also be used in conjunction with a custom video. Embodiments can provide audio for any curriculum or program, e.g., weight lifting, running, yoga, physical therapy, etc.

A. Destination Timelines

Figure 15:
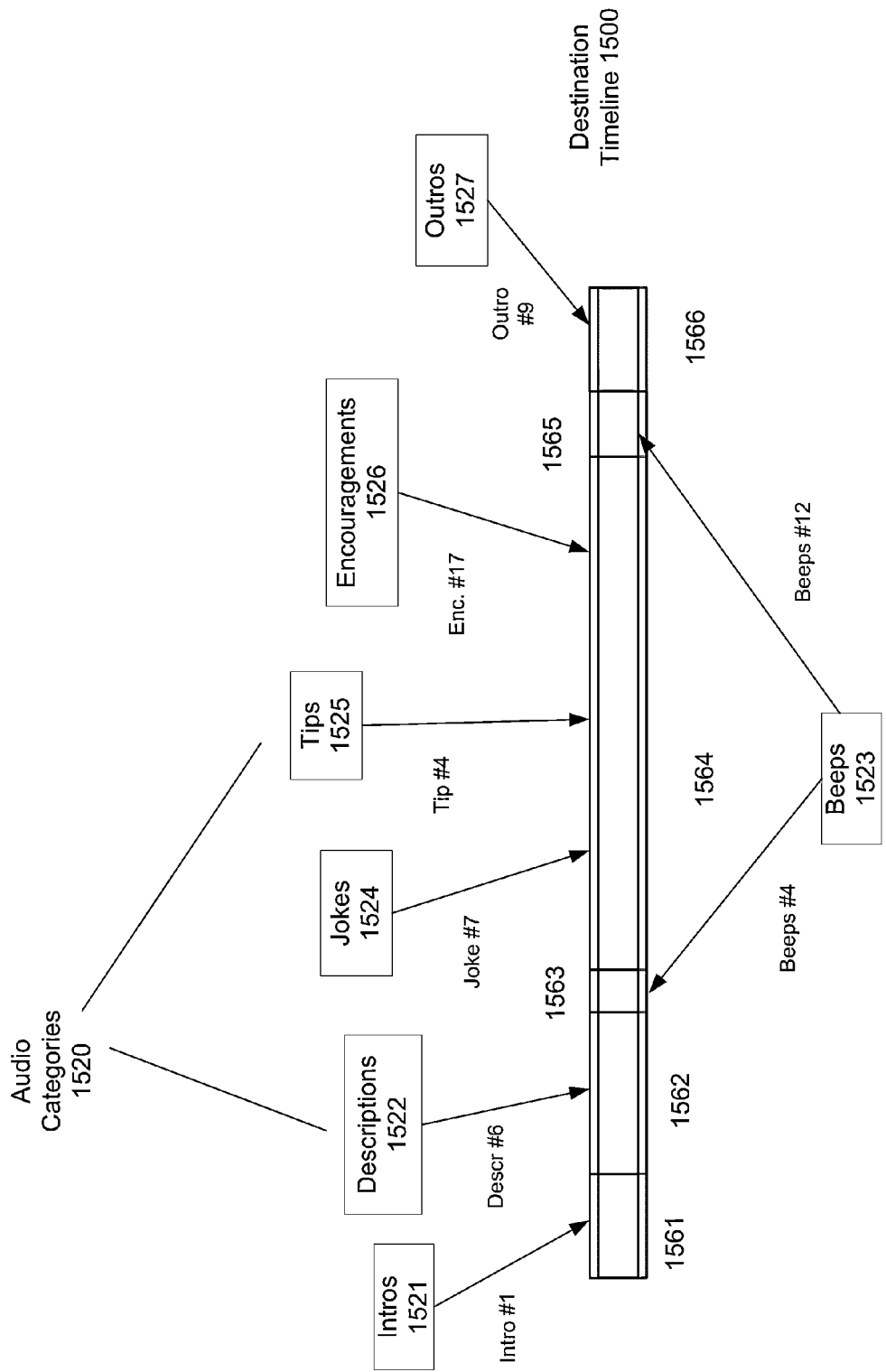
FIG. 15 shows a diagram of the destination timeline 1500 including audio clips of various audio categories 1520 according to embodiments of the present invention.

FIG. 15 shows a diagram of the destination timeline 1500 including audio clips of various audio categories 1520 according to embodiments of the present invention. Destination timeline 1500 includes a plurality of segments 1561-1566. Destination timeline 1500 corresponds to audio content to be provided for an exercise session. The exercise session can be a custom exercise session (e.g., as described herein) or predetermined exercise session (e.g., that the user can select from among a plurality of existing exercise sessions). The exercise session can include one or more exercise components.

Destination timeline 1500 corresponds to a single component of the session. Additional destination timelines can be created for other components. The destination timelines for the various components of the session can be combined to obtain a destination timeline for the entire session. Destination timeline 1500 can include configuration information about which audio clips are to be played at which time in the timeline.

As shown, the audio clips can be from a plurality of audio categories 1520. In the example shown, audio categories 1520 include intros 1521, descriptions 1522, beeps 1523, jokes 1524, tips 1525, encouragements 1526, and outros 1527. Other embodiments can include different audio categories. The audio clips can have metadata that identifies to which audio category a particular audio clip corresponds.

Destination timeline 1500 includes a plurality of segments 1561-1566. Some of the segments can require audio, and one or more other segments can optionally have audio. In this example, segments 1561, 1562, 1563, 1565, and 1565 are required segments, and segment 1564 can optionally have audio. Other embodiments can have more or less required segments. Destination timeline 1500 can correspond to an audio template that is selected for a particular component, session, or program. Different components of the same session can have different audio templates. In audio template can specify which segments are required and which ones are optional, as well as which categories can be used for which segments.

In some implementations, a particular audio category is assigned to a particular segment. For example, segment 1561 is assigned to intros 1521. Thus, an audio clip for segment 1561 is required to be selected from audio clips corresponding to the category of intros 1521. In this example, segment 1564 can optionally include one or more audio clips from one or more audio categories (jokes 1524, tips 1525, and encouragement 1526 as shown).

In one embodiment, a first pass is made through destination timeline 1500. In the first pass, audio clips are selected for the required segments. For example, segment 1561 can be identified as a required segment can be assigned to intros 1521. Then, a particular audio clip can be selected from the audio clips that have been tagged as corresponding to intros 1521. In FIG. 15, intro #1 is selected.

Various selection rules can be used to determine which audio clip to select. Such selection rules can include a preference for a variety, not to repeat an audio clip in a same session, and need as determined from user feedback. For the intros example, if push-ups have already been done in the same session and the first intro audio clip stated "Are you ready to do push-ups?", then the second component for performing push-ups can have an intro audio clip that states "Let's do push-ups again?".

In one embodiment, a score can be assigned to one or more of audio clips within a category. For example, every audio clip within a category can be assigned to score (e.g., on factors described herein), and the audio clip with a high score can be selected. In other embodiments, a audio clip with a score above a threshold can be selected. The audio clips can be assigned a score as they are tested, and the process can stop once an audio clip is found with a sufficient score. This coarse the audio clips can be specific to the particular destination timeline, and embodiments can dynamically assign based on criteria specific to the particular destination timeline.

In the first pass of this example, segment 1562 can be identified as requiring an audio clip from descriptions 1522. According to selection rules (which may be similar or different in the rules used for segment 1561), description #6 is selected. The descriptions category can describe the upcoming exercise to be performed. In one embodiment, the description can coincide with a video of a model performing the exercise.

Segment 1563 can be populated with an audio clip from beeps 1523. These beeps can indicate to the user that the exercise is about to begin. In one embodiment, beeps 1523 can also be used to indicate that the exercise is about to end. The beeps can also be used at periodic times during the exercise, e.g., to indicate when each rep of an exercise should be completed. The beeps can be at a prescribed cadence, which may be determined as part of a custom exercise session. For example, the cadence can correspond to a particular user rank for the component. Segment 1566 corresponds to outros 1527.

Segment 1564 is shown as being able to accept audio clips from categories of jokes 1524, tips 1525, and encouragements 1526. Thus, a segment can receive more than one audio clip, and the audio clips can be from more than one category, but can be from a same category. This is also true for required segments. Tips can provide suggestions for how to perform an exercise, e.g., with good form. Encouragements can be provided to encourage the user to complete an exercise. Other categories that might be used for segment 1564 include other time information, e.g., "you're halfway there".

Once a set of one or more audio clips has been selected, each audio clip can be assigned to play at a particular time in destination timeline 1500. Various methods can be used to determine when to play the audio clips. For example, the audio clips be specified to play with uniform spacing in between.

One criteria they can be used to select audio clips for an optional segment is a total amount of time that audio is to be played for the segment. For example, it can be specified that audio is to be played 40% of the time (or about 40%+/−a cutoff). With such a criteria, the audio clips in the respective categories can be searched to identify one or more suitable audio clips that satisfy this constraint (e.g., using a weighted depth first search). As a segments where just one audio clip is chosen, a score can be assigned to audio clips. Further, a score can be assigned to sets of audio clips. A set can be assembled and then a score can be assigned based on criteria described herein. Then, they can be ascertained as to whether the score for the set is sufficient (e.g., above a threshold).

The score for a particular audio clip a set of audio clips can be determined based on user feedback. For example, the user feedback can indicate that the user consistently fails the exercise at a particular point (e.g., at a particular rep or at a specific time). In this case, the score of a particular or any encouragement can increase as a result, e.g., such that an encouragement would be provided at a particular time.

As mentioned above, once the destination timeline for various components of a session have been completed, the destination timelines can be combined into a total destination timeline for the exercise session. The total destination timeline can be saved as a configuration file, much of the same way the configuration file can be saved for a custom video. This configuration file can be sent to an audio generation engine for creating the final audio content. As with the video, the audio can be stream percent is a file. And, the audio content can be generated on a server or on a client device using the audio configuration file.

B. Method

Figure 16:
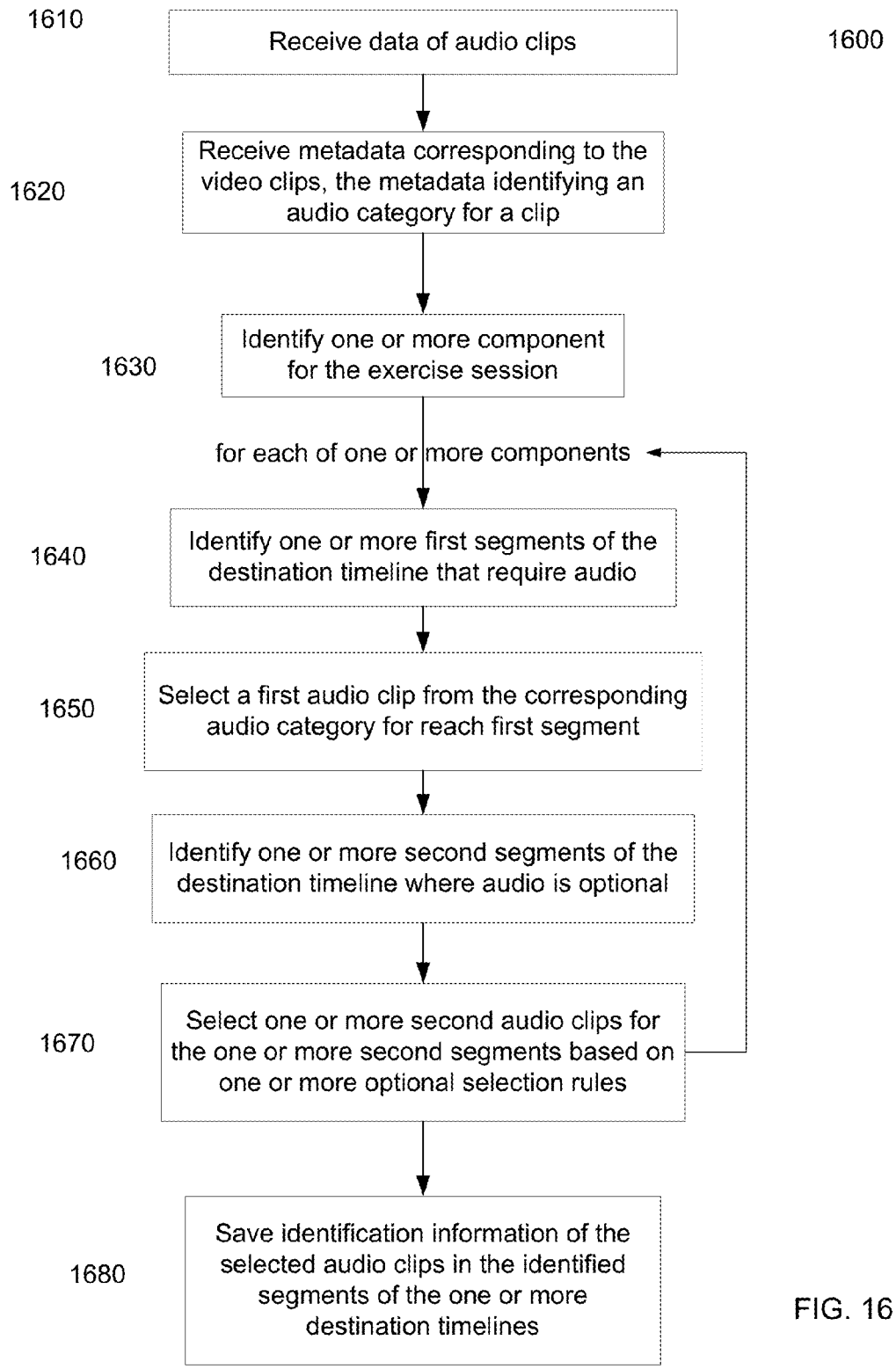
FIG. 16 is a flowchart of a method 1600 of generating custom audio content for an exercise session according to embodiments of the present invention.

FIG. 16 is a flowchart of a method 1600 of generating custom audio content for an exercise session according to embodiments of the present invention. As examples, the custom audio content can be an audio file or an audio stream. Method 1600 can be performed by a computer system, e.g., a same computer system that generates the configuration file for video.

At block 1610, data of a plurality of audio clips corresponding to a plurality of audio categories are received. The audio clips can be noises, voices, or any suitable audio. The audio clips can be taken of various people. Each audio clip can be tagged with metadata identifying a category to which the audio clip belongs.

At block 1620, metadata corresponding to the plurality of audio clips are received. The metadata identifies an audio category for each audio clip. The data of the plurality of audio clips can be processed to obtain the metadata. The metadata for an audio clip can identify a last time that the audio clip was played in an exercise session for a user.

At block 1630, one or more components are identified for the exercise session. Each component corresponds to a respective physical exercise. The components can be specified, e.g., using method 970. In other embodiments, the user can select a predetermined session.

Blocks 1640-1670 are repeated for each component. A destination timeline of audio is created for each component. In some embodiments, the audio clips themselves are not needed and only the metadata and other data may be used to determine a destination timeline.

At block 1640, one or more first segments of the destination timeline that require audio are identified. Each first segment corresponds to an audio category. In one embodiment, an audio template can be selected. The audio template can specify a duration for each of a plurality of segments of the destination timeline for a particular component. And, the audio template can specify which one or more segments are first segments and which one or more segments are second segments.

At block 1650, a first audio clip is selected from the corresponding audio category for each first segment. The metadata is used to identify the corresponding audio category. In one embodiment, the first audio clip can be selected based on a score. A score can be assigned to a plurality of audio clips of the corresponding category. Then, it can be determined that the first audio clip has a first score that satisfies one or more criteria. In some implementations, a score can be determined for every audio clip and a top score can be selected.

At block 1660, one or more second segments of the destination timeline that are optional for audio identified. In one embodiment, the one or more second segments can be identified from an audio template. The audio template can be in any suitable form such that the first and second segments can be identified.

At block 1670, one or more second audio clips are selected for the one or more second segments based on one or more optional selection rules. In one embodiment, the one or more optional selection rules include one or more criteria based on user feedback from a current session or a previous session. For example, the user feedback can indicate that the user fails at a particular point while performing a particular component. A second audio clip can then correspond to an encouragement that is selected to be played at the particular point. In another embodiment, the one or more optional selection rules can include a total time for audio during a second segment.

In one implementation, a set of the one or more second audio clips can be selected for the one or more second segments based on a score for a set. A combined score can be determined for each of one or more possible sets of one or more audio clips. Thus, a search can be performed of various combination of audio clips to find a score that satisfies one or more criteria (e.g., greater than a threshold).

At block 1680, identification information of the selected audio clips in the identified segments of the one or more destination timelines is saved. The identification information is usable to generate the custom audio content. In one embodiment, the identification information (e.g., as a configuration file) is provided to an audio generation engine for combining the selected audio clips in the identified segments of the one or more destination timeline to obtain the custom audio content. The audio generation engine (e.g., in the same computer system or a different one that determined the identification information) can then generate the custom audio content using the identification information.

VII. Other Functionality

Some embodiments can allow the user to make purchases from within the application, and deliver recommendations based on the data gathered by a user's use of the system. For instance, embodiments may recognize that a user is not regularly inputting their weight and may deliver an advertisement, based on that insight, to the user for a WiFi enabled scale that automatically uploads weight to the system, via an API, every time that user gets on it. The user may then purchase the scale from within the application, or may follow a link to an outside service that will fulfill the order.

Some embodiments allow the user to engage with social networks to share fitness related data. For instance, overweight users can easily connect with other overweight users to share workout tips, customized workouts, and support for each other. The focus on social networking integration with certain embodiments may lead to greatly increased levels of physical activity for many users.

Certain embodiments may push users to engage in physical activity by issuing fitness challenges to them, based on the user's fitness level, preferences or other criteria. Challenges might be issued in response to a user request, at the direction of the system based on user feedback, based on a social goal (e.g. a group of users wants to collectively lose a certain amount of weight), or based on an event occurring in the user's area (e.g. the New York City Marathon). Digital badges can be earned by completing challenges and achieving milestones.

For example, a user lives in New York City wants to greatly improve the user's long distance running ability, and indicates both facts to the system through manual input of data (or automatically, in the case of user location), may be challenged to run the New York City Marathon in the year following the user's signing up for the service. Embodiments could then deliver content to the user that would not only be customized based on user feedback (e.g. the user's performance as he engages in content-specific activities), but also based on the overarching goal of getting the user to a position where he could run the New York City Marathon. Other challenges might be on a smaller scale, such as having a user do 1,000 pushups in a week. For this challenge, the atomized content delivered to the user would include enough pushup routines to allow the user to achieve this goal.

Certain embodiments may also prompt the user to engage health services. More specifically services can be connected to the system which may further incentivize the user reaching the user's goals, by offering incentives and rewards for user progress. For instance, a partner may deliver an advertisement to the user through a program that offers the user a discount on exercise apparel or health insurance, but which may only be redeemed if the user first completes a certain task or reach a certain goal in an exercise program. Users may consider such discounts and other rewards as being extra motivation to engage in physical activity.

VIII. Computer System

Figure 17:
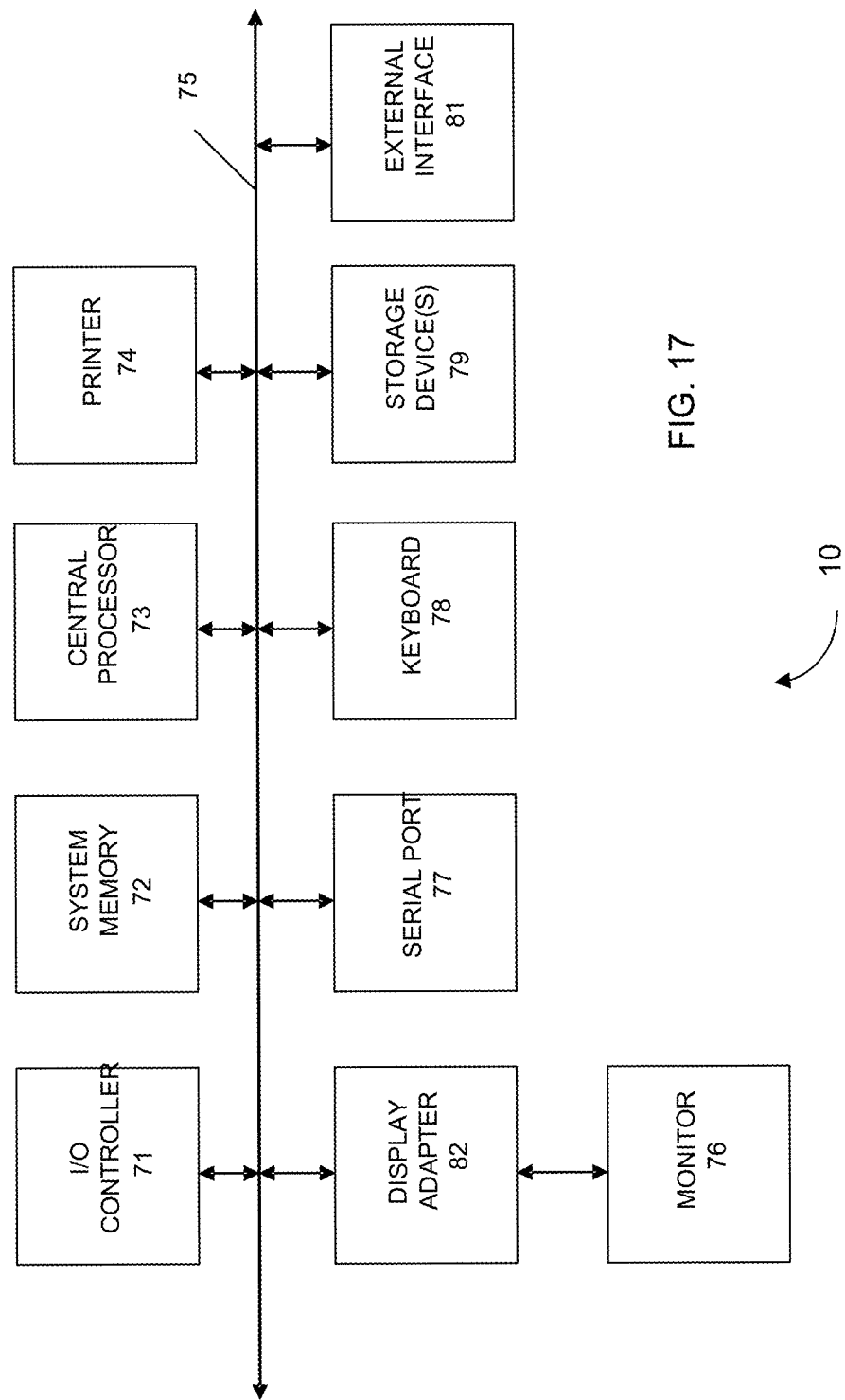
FIG. 17 shows a block diagram of an example computer system 10 usable with system and methods according to embodiments of the present invention.

Any of the computer systems mentioned herein may utilize any suitable number of subsystems. Examples of such subsystems are shown in FIG. 17 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 17 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of generating a customized exercise video for a user, the method being implemented by (i) a computer system comprising one or more processors and (ii) a wearable sensor device comprising one or more sensors, the method comprising:
(a) identifying a plurality of components, each component corresponding to a respective physical exercise and associated with one of a plurality of categories;
(b) assigning a difficulty rank to each component, wherein assigning the difficulty rank to an instant component includes:
receiving user ranks for a plurality of prior users that have performed the instant component,
receiving user feedback from the plurality of prior users about performing the instant component, and
setting the difficulty rank of the instant component based on the user feedback from the plurality of prior users and the user ranks for the plurality of prior users;
(c) determining, by the computer system and for each category in the plurality of categories, a category user rank for the user;
(d) identifying, by the computer system and for each of the plurality of categories, a respective set of components in the plurality of components having a difficulty rank within a specified range of the category user rank as being available;
(e) generating, by the computer system, the customized exercise video including an exercise session composed of a plurality of available components identified in (d);
(f) displaying the customized exercise video to the user;
(g) receiving, by the computer system, sensor data of the user from the wearable sensor device, wherein the sensor data of the user are generated by the one or more sensors of the wearable sensor device when the user is wearing the wearable sensor device, and wherein the sensor data of the user indicate the user's performance of, or the user's physiological condition during, a physical exercise of the customized exercise video; and
(h) modifying, during playback of the customized exercise video and by the computer system, the content of the customized exercise video based on the sensor data of the user by performing an action selected from the group consisting of: (a) changing an amount of a physical exercise of a particular component of the plurality of available components, (b) adding to the customized exercise video a new component having a difficulty rank different from that of the particular component of the plurality of available components, (c) adding to the customized exercise video a new coaching audio clip not initially included in the customized exercise video, and (d) any combination thereof.

2. The method of claim 1, wherein determining the category user rank comprises:
receiving an initial user rank;
receiving instant user feedback about a first component that the user has performed, the first component having a first difficulty rank; and
changing the initial user rank based on the instant user feedback, the initial user rank, and the first difficulty rank.

3. The method of claim 2, further comprising:
calculating a predicted score for the user against the first component based on the initial user rank and the first difficulty rank;
calculating a user score for the user against the first component based on the instant user feedback; and
comparing the predicted score to the user score to determine a change in the initial user rank.

4. The method of claim 3, further comprising:
determining a winning stake and a losing stake based on the initial user rank and the first difficulty rank; and
calculating an outcome score that specifies a percentage of the winning stake or the losing stake to use in changing the initial user rank.

5. The method of claim 1, wherein the user feedback includes a level of completion of one or more components.

6. The method of claim 1, wherein the user feedback includes responses to a questionnaire.

7. The method of claim 1, wherein the user feedback includes sensor data from a device that measures a physiological condition and/or a body motion of the plurality of prior users.

8. The method of claim 7, wherein the sensor data were obtained while the plurality of prior users were performing a component.

9. The method of claim 1, wherein the plurality of categories correspond to different parts of a body.

10. The method of claim 1, wherein the components in the exercise session are arranged in a particular order.

11. The method of claim 1, wherein the specified range for a first category is offset from the category user rank.

12. The method of claim 1, wherein assigning the difficulty rank to each component occurs prior to receiving a request to generate the customized exercise video.

13. The method of claim 1, wherein generating the customized exercise video comprises generating a video file.

14. The method of claim 13, wherein displaying the customized exercise video to the user comprises sending the video file by a video server over a network to a client device and playing back the video file to display the customized exercise video on the client device.

15. A computer product comprising a non-transitory computer readable medium storing a plurality of instructions that when executed control a computer system to generate a customized exercise video for a user, the instructions comprising:
(a) identifying a plurality of components, each component corresponding to a respective physical exercise and associated with one of a plurality of categories;
(b) assigning a difficulty rank to each component, wherein assigning the difficulty rank to an instant component includes:
receiving user ranks for a plurality of prior users that have performed the instant component,
receiving user feedback from the plurality of prior users about performing the instant component, and
setting the difficulty rank of the instant component based on the user feedback from the plurality of prior users and the user ranks for the plurality of prior users;
(c) determining, for each category in the plurality of categories, a category user rank for the user;
(d) identifying, for each of the plurality of categories, a respective set of components in the plurality of components having a difficulty rank within a specified range of the category user rank as being available;
(e) generating the customized exercise video including an exercise session composed of a plurality of available components identified in (d); and
(f) displaying the customized exercise video to the user;
(g) receiving sensor data of the user from a wearable sensor device, wherein the sensor data of the user are generated by one or more sensors of the wearable sensor device when the user is wearing the wearable sensor device, and wherein the sensor data of the user indicate the user's performance of, or the user's physiological condition during, a physical exercise of the customized exercise video; and
(h) modifying, during the playback of the customized exercise video, the content of the customized exercise video based on the sensor data of the user by performing an action selected from the group consisting of: (a) changing an amount of a physical exercise of a particular component of the plurality of available components, (b) adding to the customized exercise video a new component having a difficulty rank different from that of the particular component of the plurality of available components, (c) adding to the customized exercise video a new coaching audio clip not initially included in the customized exercise video, and (d) any combination thereof.

16. The computer product of claim 15, wherein determining the category user rank comprises:
receiving an initial user rank;
receiving instant user feedback about a first component that the user has performed, the first component having a first difficulty rank; and
changing the initial user rank based on the instant user feedback, the initial user rank, and the first difficulty rank.

17. The computer product of claim 16, wherein the instructions further comprise:
calculating a predicted score for the user against the first component based on the initial user rank and the first difficulty rank;
calculating a user score for the user against the first component based on the instant user feedback; and
comparing the predicted score to the user score to determine a change in the initial user rank.

18. The computer product of claim 17, wherein the instructions further comprise:
determining a winning stake and a losing stake based on the initial user rank and the first difficulty rank; and
calculating an outcome score that specifies a percentage of the winning stake or the losing stake to use in changing the initial user rank.

19. The computer product of claim 15, wherein the user feedback includes a level of completion of one or more components.

20. The computer product of claim 15, wherein the user feedback includes sensor data from a device that measures a physiological condition and/or a body motion of the plurality of prior users.

21. The computer product of claim 15, wherein the specified range for a first category is offset from the category user rank.

* * * * *